United States Patent [19]
Aramaki et al.

[11] Patent Number: 5,491,592
[45] Date of Patent: Feb. 13, 1996

[54] METHOD OF AND APPARATUS FOR REPRODUCING A RECORDING MEDIUM

[75] Inventors: Junichi Aramaki, Chiba; Nobuyuki Kihara, Tokyo, both of Japan

[73] Assignee: Sony Corporation, Japan

[21] Appl. No.: 171,107

[22] Filed: Dec. 21, 1993

[30] Foreign Application Priority Data

Jan. 6, 1993 [JP] Japan ................................ 5-016697

[51] Int. Cl.⁶ .................................................... G11B 5/00
[52] U.S. Cl. ........................................ 360/59; 360/32
[58] Field of Search ................................ 360/59, 32, 48, 360/51, 50, 72.1, 72.2, 72.3, 78.06

[56] References Cited

U.S. PATENT DOCUMENTS

| | | | |
|---|---|---|---|
| 4,546,391 | 10/1985 | Kimura | 360/19.1 |
| 4,613,967 | 9/1986 | Hamada et al. | 369/221 |
| 4,775,969 | 10/1988 | Osterlund | 360/48 X |
| 4,789,911 | 12/1988 | Fukushima et al. | 360/72.2 |
| 4,851,933 | 7/1989 | Gugaya et al. | 360/48 X |
| 4,926,405 | 5/1990 | Hangai et al. | 360/78.06 X |
| 5,038,231 | 8/1991 | Harigaya et al. | 360/69 |
| 5,045,956 | 9/1991 | Ejimra | 360/51 |
| 5,079,651 | 1/1992 | Tsuchida | 360/72.2 |
| 5,200,864 | 4/1993 | Dimer et al. | 360/48 |
| 5,224,087 | 6/1993 | Maeda et al. | 369/54 |
| 5,243,588 | 9/1993 | Maeda et al. | 369/54 |
| 5,274,513 | 12/1993 | Nakamo et al. | 360/72.2 |
| 5,293,276 | 3/1994 | Dumar et al. | 360/50 X |
| 5,305,155 | 4/1994 | Akagiri et al. | 360/32 |

FOREIGN PATENT DOCUMENTS

0051285A2  5/1982  European Pat. Off. ................. 360/32
0472414A1  2/1992  European Pat. Off. ................. 360/32

*Primary Examiner*—Donald T. Hajec
*Assistant Examiner*—Thien Minh Le
*Attorney, Agent, or Firm*—Limbach & Limbach; Charles P. Sammut

[57] ABSTRACT

A reproducing apparatus of a recording medium, which has address data recorded thereon, a set of data discretely recorded in a plurality of small recording areas thereon, and information indicative of connective relationships between the small recording areas recorded thereon. The reproducing apparatus includes a readout device, a memory, and a controller. The readout device reads data and address data recorded on the recording medium. The memory stores the information indicative of connective relationships between the small recording areas in the data read by the readout device. The controller controls the readout device in high-speed reproduction to repeatedly make an access in accordance with the information stored in the memory and read the data stored in the small recording areas in units of a predetermined data amount. The controller further executes control, when the readout device has moved to a position outside a preceding small recording area after an access, so that the read means will access a subsequent small recording area in a connective relationship with the preceding small recording area. When the address corresponding to the position in the subsequent small recording area, reached after this accessing operation is within a predetermined range of the start address of the subsequent small recording area, then the readout device reads data from the recording medium starting at the position reached.

21 Claims, 16 Drawing Sheets

FIG. 1
(PRIOR ART)
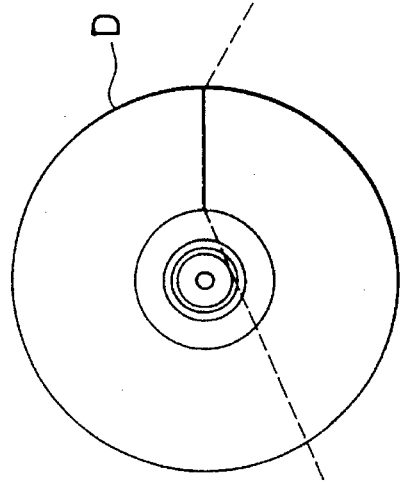
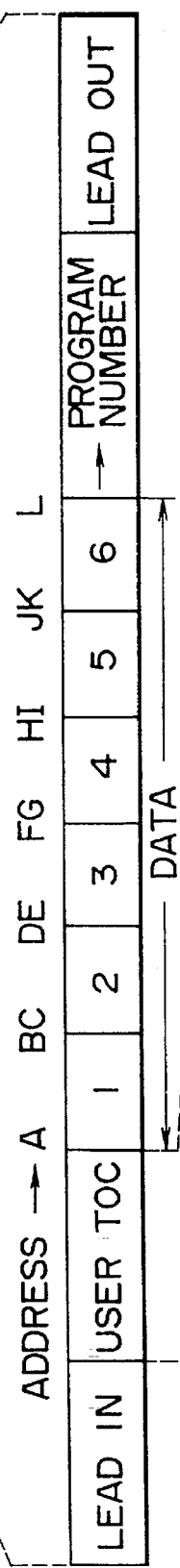

FIG. 4
(PRIOR ART)

| PROGRAM NUMBERS | ADDRESSES |
|---|---|
| 1 | A  B |
| 2 | C  D |
| 3 → BLANK | E  F → BLANK |
| 4 → 3 | G  H |
| 5 → 4 | I  J |
| 6 → 5 | K  L |

FIG. 5
(PRIOR ART)

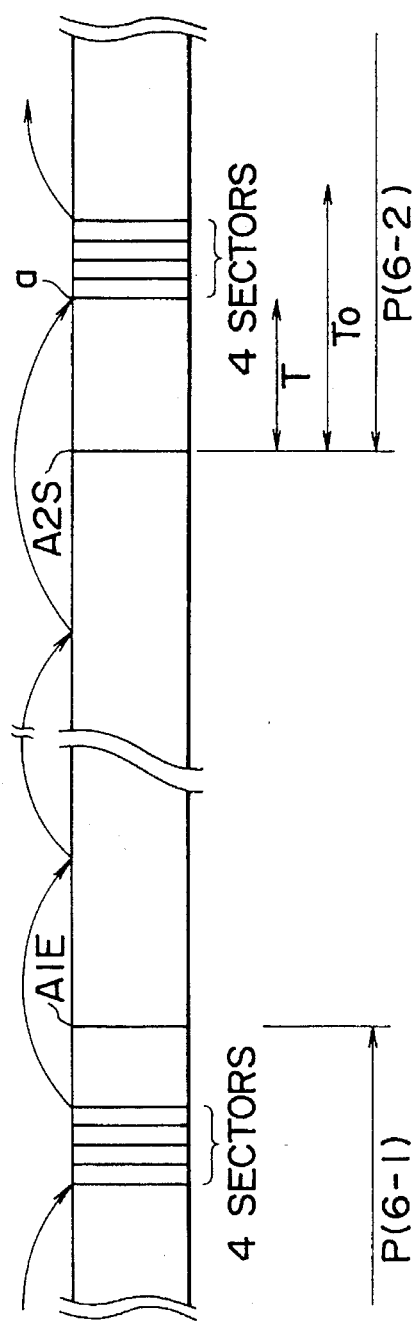
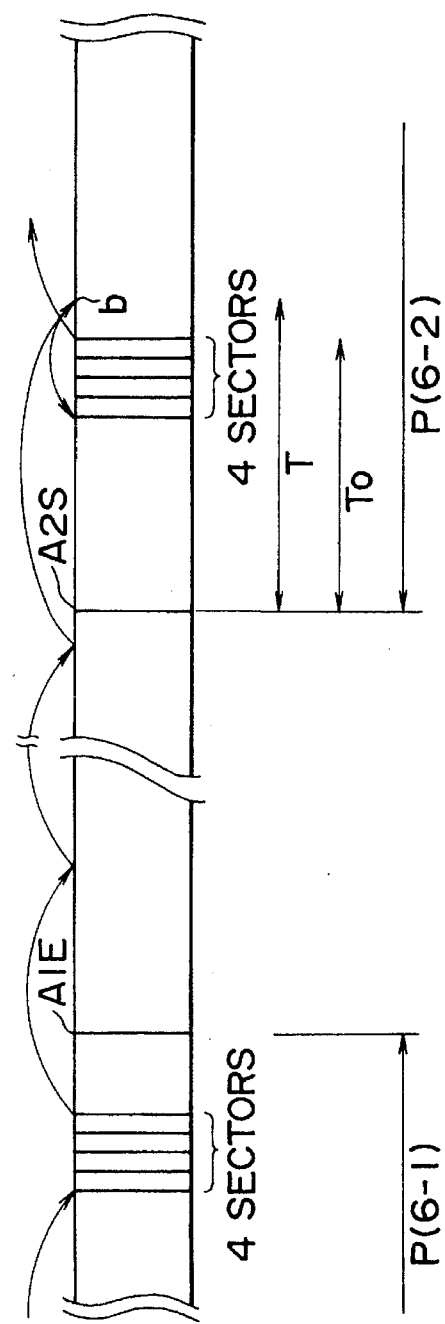
F I G. 12(A)
F I G. 12(B)

FIG. 14
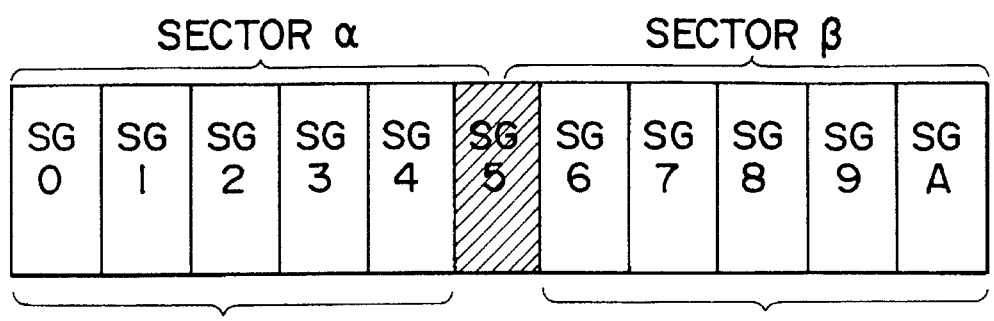
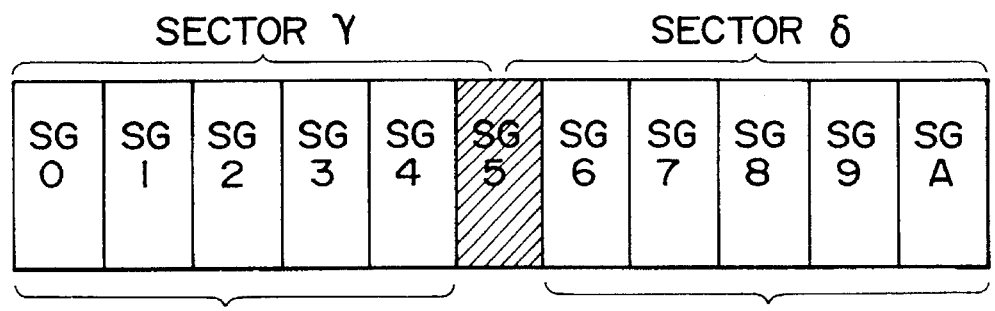
FIG. 15
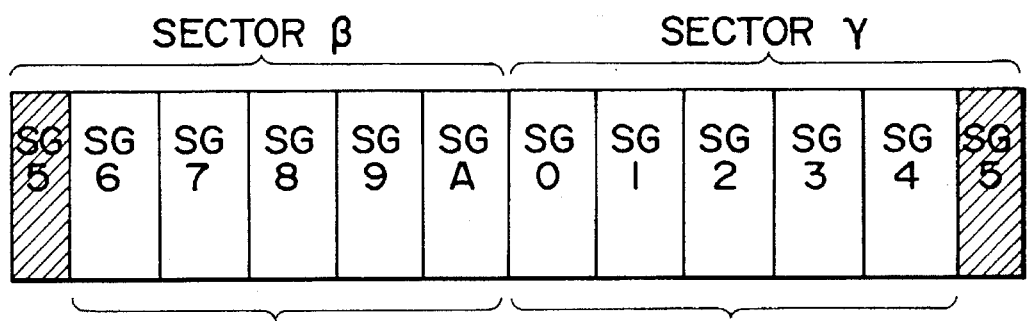
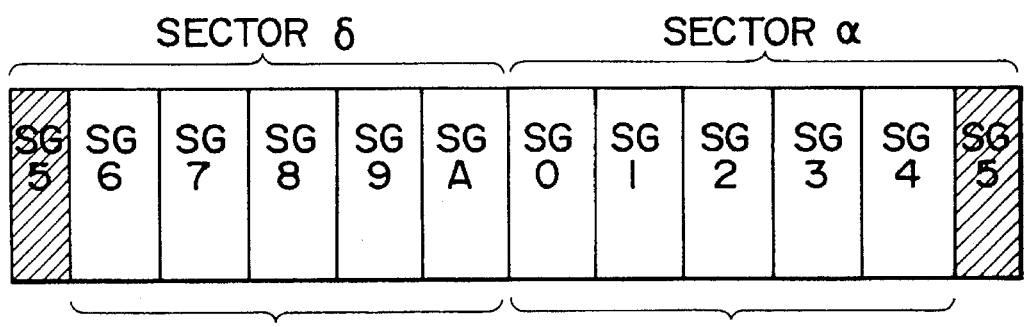

METHOD OF AND APPARATUS FOR REPRODUCING A RECORDING MEDIUM

BACKGROUND

1. Field of the Invention

The present invention relates to a method of reproducing a recording medium and an apparatus for reproducing a recording medium. More particularly, to a method of and an apparatus for reproducing a recording medium on which data is recorded discretely.

2. Background of the Invention

As recording media for recording music information, audio signals, and general data thereon, there are disk-shaped recording media in addition to tape-shaped recording media such as a magnetic tape. Some of the disk-shaped recording media are magnetic disks such as a floppy disk and optical discs such as a magneto-optical disc on which data can be recorded optically. In the case of the magneto-optical disc, it is possible to repeatedly erase or rewrite data once recorded on the disc and the disc has a capacity of recording a greater amount of data as compared with the magnetic disk. By way of example, a case where a magneto-optical disc is used as the recording medium and an audio signal or music information is recorded on and reproduced from the magneto-optical disc will be described below.

FIG. 1 shows an example of a format of a magneto-optical disc D as a disk-shaped recording medium on which data can be recorded. On a magneto-optical disc D shown in FIG. 1, there are provided a lead-in area on the side of the inner circumference of the disc and a lead-out area on the side of the outer circumference of the disc. The area provided between the lead-in area and the lead-out area on the magneto-optical disc D constitutes a data-recording area in which data is actually recorded. At a portion of the data-recording area close to the lead-in area, there is provided a TOC (Table Of Contents) area. In this TOC area, there are recorded the total recording time of data or programs recorded in the data-recording area of the magneto-optical disc D, the total number of data or the total number of programs, start addresses and end addresses of the data or programs, title information such as titles of pieces of music, and information indicative of connective relationships between parts, as small recording areas, to be described later. The TOC area has a first TOC area having information, not rewritable, recorded therein when the magneto-optical disc is fabricated and a user-TOC area as a second TOC area having therein recorded information which is rewritable by the user. As shown in FIG. 1, there are recorded start addresses and end addresses for six programs in the second TOC area of the magneto-optical disc D. For example, there are recorded the start address A and end address B of the program number 1, the start address C and end address D of the program number 2, and so on through the start address K and end address L of the program number 6.

As shown in FIG. 2, the magneto-optical disc D is provided with a pregroove G previously formed in one side of the disc substrate Sd of the magneto-optical disc D. The pregroove G is arranged to be wobbling at a cycle of 1/(21.05 KHz to 23.05 KHz) in the radial direction of the magneto-optical disc D. Address data can be recorded along the whole circumference of the magneto-optical disc by wobbling the pregroove G in the radial direction of the disc in accordance with FM-modulated address information. A spot SP of a light beam emitted from an optical head is adapted to travel along the pregroove G, relatively to the magneto-optical disc D.

FIG. 3 shows a detailed record format of the magneto-optical disc D. Basically, recording of data on the magneto-optical disc D and reading of data recorded on the magneto-optical disc D are performed in units of a called cluster. Each cluster is formed of 32 data sectors, in which data are recorded, and 4 linking sectors disposed on the forward side of the data sectors. Of the 4 linking sectors, 3 sectors L at the head are provided for the purpose of preventing interleave interference from occurring between adjoining clusters and 1 sector S following them is provided for recording subcode data therein. The sectors are formed of a plurality of sound groups, i.e., 2 sectors are formed of 11 sound groups. In this example, 1 sector is formed of 2352 bytes, of which 2332 bytes are for data. One sound group is formed of 424 bytes. Further, one sound group includes 512 samples of audio signals for the right channel and left channel, which corresponds to the reproducing time 11.61 msec.

In the case of the present magneto-optical disc D, the data recorded on the disc can be erased or rewritten, and therefore, it is possible to edit data previously recorded thereon and make various data into one set of data. For example, six programs from program number 1 to program number 6 are recorded on the magneto-optical disc D as shown in FIG. 1. Suppose that the program number 3 is erased from them. This erasing operation can be carried out not only by actually erasing the data in the data-recording area from the start address E to the end address F, but also by erasing the data related to the program number 3 in the second TOC area. In this example, referring to FIG. 4, if the data related to the program number 3 in the second TOC area is rewritten to blank data, the program number 3 is considered to have been erased. At the same time, the program numbers 4, 5, and 6 existent so far are sequentially changed to new program numbers 3, 4, and 5 as shown in FIG. 4.

Figure 5:
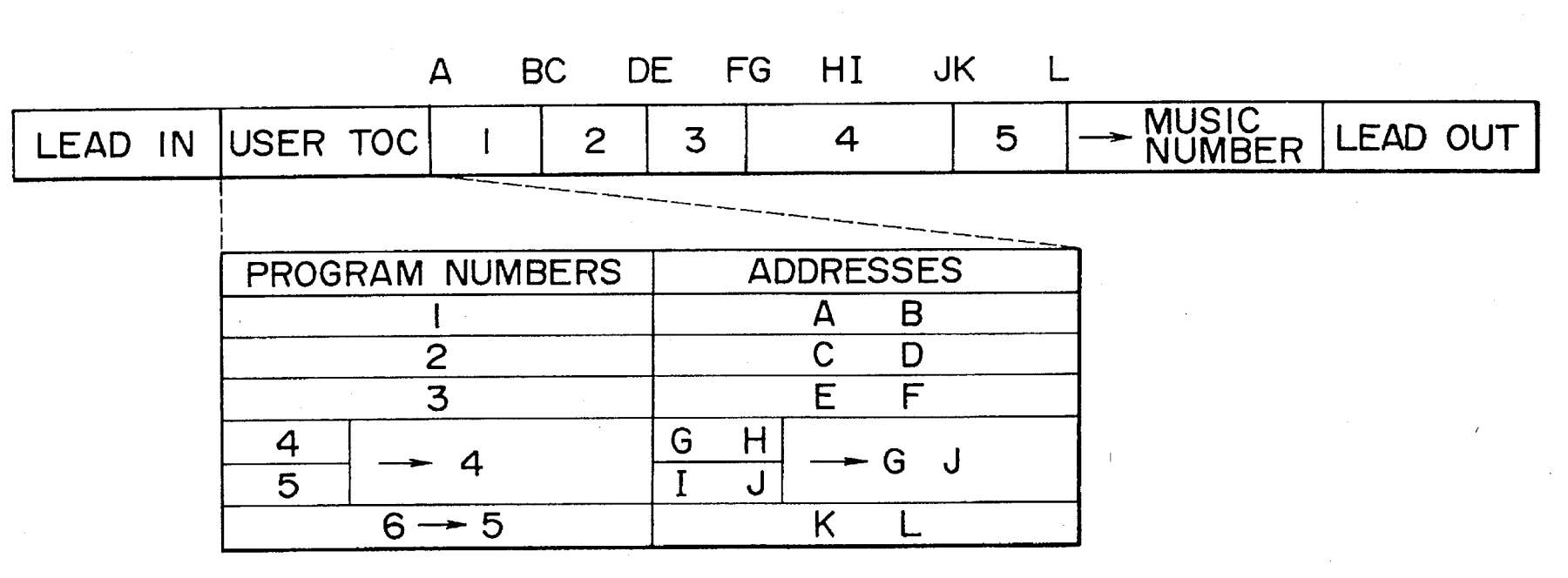

FIG. 5 shows an example where two sets of data are combined into one set of data. In FIG. 5 is shown a case where programs which have so far been the program numbers 4 and 5 are changed to a new program number 4 in the second TOC area. In this case, with the change in the program number, the start address is set to G and the end address is set to J. At the same time, the program which has so far been the program number 6 is changed to a new program number 5. In this way, programs can be erased and edited at will in the magneto-optical disc D.

While it is possible to erase and edit previously recorded data and programs on the magneto-optical disc D according to user needs as described above, if data or a program is recorded anew after the above described erase or edition has been made, such data can not always be recorded continuously in the data-recording area of the magneto-optical disc D. The reason why is because the area which can be used for recording data becomes discontinuous, or discrete, by the erasing processing as described in FIG. 4 and FIG. 5. This will be described more particularly with reference to FIG. 6. When a program with a program number 6 is newly recorded, one set of program (data) comes to be recorded in a plurality of small recording areas. The small recording area will hereinafter be called "part P". In the example shown in FIG. 6, the program number 6 is newly recorded divided in four parts from the part P(6-1) to part P(6-4). The information indicative of the connective relationships from the part P(6-1) to the part 6(P-4) is recorded in the second TOC area. When the program number 6 is reproduced, the data recorded in the areas from the part P(6-1) to the part P(6-4) are sequentially read in accordance with the information about connections recorded in the second TOC area.

A case where the magneto-optical disc D with data recorded as described above is reproduced at high speed will be described below with reference to FIG. 7(A) and FIG. 7(B). The phase high speed reproducing operation is herein used to refer to an operation to partially reproduce and output the data recorded in the data-recording area during a searching operation of a plurality of sets of data and programs recorded on the magneto-optical disc D. In the high-speed reproduction, such an operation for example is repeated as, after the light beam emitted from an optical head was caused to jump over 10 tracks of the magneto-optical disc D, to have data in four sectors reproduced as shown in FIG. 7(A).

When one set of program or data is recorded within one part, satisfactory results will be obtained by simply repeating the high-speed reproducing operation. However, when one program is discretely recorded in a plurality of parts P, it becomes necessary, after finishing high-speed reproduction of a preceding part P, to access the subsequent part P which is in a connective relationship with the preceding part P. When subsequent part P is accessed high-speed reproduction of this subsequent part P can be performed. A state of such high-speed reproduction is shown in FIG. 7(B).

While high-speed reproduction of the part P(6-1), for example, is being performed, if the reproducing point as a result of a 10-track jump gets out of the part P(6-1), then the part P(6-2) subsequent to the part P(6-1) is searched for. When the light beam emitted from the optical head gets inside the range of a part P(6-2) after repetition of accessing operations, it now makes a track jump in the backward direction, and if it then gets out of the part P(6-2), it makes a forward jump again. Through repetition of such operations, it finally locates the starting point, i.e., the start address, of the part P(6-2). Then, the operation to reproduce four sectors from the start point of the part P(6-2) and make the 10-track jump (i.e. high-speed reproduction) is performed for in the part P(6-2).

In this way, the high-speed reproducing operation as shown in FIG. 7(B), when the reproducing point by the light beam emitted from the optical head has got out of a specific part P, it will search for the point corresponding to the start address of the subsequent part P and the high-speed reproduction is started again when the searched start address of the subsequent part P is located. This search can take a long time. In the worst case, reproduced sound the output from the apparatus is broken during the reproduction due ti delay caused by the searching operation.

SUMMARY OF THE INVENTION

An object of the present invention is to provide a reproducing apparatus of a recording medium which solves the above-mentioned problems.

Another object of the present invention is to provide a method of reproducing a recording medium which solves the above-mentioned problems.

According to an aspect of the invention, there is provided a reproducing apparatus for a recording medium, which has address data recorded thereon, a set of data discretely recorded in a plurality of small recording areas thereon, and information indicative of connective relationships between the small recording areas recorded thereon. The reproducing apparatus includes a reading device, a memory, and a controller. The reading device reads the data and address data recorded on the recording medium. The memory stores the information indicative of connective relationships between the small recording areas in the data read by the reading device. The controller, in high-speed reproduction, executes control so that the reading device repeatedly makes an access in accordance with the information stored in the memory and reads the data stored in the small recording areas in units of a predetermined data amount. The controller further executes control so that, when the reading device has moved to a position outside a preceding small recording area after an access, the reading device makes an access to a subsequent small recording area in a connective relationship with the preceding small recording area. When the address data corresponding to the position in the subsequent small recording area reached after an access is within a predetermined range of the start address of the subsequent small recording area then, the reading device reads data from the recording medium starting at the reached position.

According to another aspect of the invention, there is provided a reproducing method of a recording medium, which has address data recorded thereon, a set of data discretely recorded in a plurality of small recording areas thereon, and information indicative of connective relationships between the small recording areas recorded thereon. The recording medium reproducing method includes the steps of storing the information indicative of connective relationships between the small recording areas read by a reading device into a memory, and executing control, in high-speed reproduction, by means of a controller so that the reading device repeatedly makes an access in accordance with the information stored in the memory and reads the data stored in the small recording areas in units of a predetermined amount. Also, control, when the reading device has moved to a position outside a preceding small recording area after an access, then the reading device makes an access to a subsequent small recording area in a connective relationship with the preceding small recording area. When the position reached after an access in the subsequent small recording area is at an address within a predetermined range of its start address, the reading device reads data starting at the reached position in the subsequent small recording area.

According to a further aspect of the invention, there is provided a reproducing method of a recording medium, which has address data recorded thereon and, data discretely recorded in a plurality of small recording areas of a data-recording area thereof. The discretely recorded data is constituted of a plurality of sectors, each sector being formed of a plurality of segments. One data unit thereof is formed of a pair of sectors, and information indicative of connective relationships between small recording areas is recorded in another recording area in the data-recording area of the recording medium. The recording medium reproducing method comprises the steps of judging by means of a judging device whether or not the data read by a reading device is reproducible for each sector and reproducing and outputting only the sectors judged to be reproducible by the judging device.

According to yet another aspect of the invention, there is provided a reproducing method of a recording medium, which has address data recorded thereon and data discretely recorded in a plurality of small recording areas of a data-recording area thereof. The discretely recorded data is constituted of a plurality of sectors and each sector is formed of a plurality of segments. One data unit thereof being formed of a pair of sectors, and information indicative of connective relationships between small recording areas is recorded in another recording area in the data-recording area of the recording medium. The recording medium reproducing method includes the steps of storing the information indicative of connective relationships between the small recording areas read by a reading device into a memory, and executing control in high-speed reproduction by means of a controller so that the reading device repeatedly makes an access in accordance with the information stored in the memory. The reading device the data stored in the small recording areas in units of a predetermined data amount, judging, by means of the controller, whether or not the data read by the reading device is reproducible for each sector. Control is executed so that only the sectors judged to be reproducible are reproduced and output.

According to the invention, when a position reached after an access is off the starting position of a small recording area and within a predetermined range of the start address of the small recording area, reading of data is started from the reached position. Thereby, high-speed reproduction can be achieved and the reproduced output signal is prevented from being interrupted.

According to the invention, when either of the sector in a pair belonging to a plurality of sectors constituting data may be judged to be unreproducible. Also, with respect to a segment connecting two sectors in pair, the data of a sector may be judged unreproducible. When the data is judged to be unproducible, the data of the segment connecting sectors in pair are not used in performing data reproduction. Thereby, abnormal sound or the like in the reproduced output signal is prevented from being produced.

BRIEF DESCRIPTION OF THE DRAWINGS

The invention will be mire readily understood with reference to the accompanying drawings, wherein:

FIG. 1 is a diagram showing a record format of a disc, on which the present invention is based.

FIG. 4 is a diagram showing changes in data made in the user TOC as a result of erase of a set of recorded data on a disc, on which the present invention is based.

FIG. 5 is a diagram showing changes in data made in the user TOC as a result of combination of two sets of data recorded on a disc, on which the present invention is based.

FIG. 7(A) is a diagram for explaining high-speed reproducing operations made within the same part. FIG. 7(B) is a diagram for explaining high-speed reproducing operations made when there is a discrete preceding part subsequent part.

FIG. 12(A) and FIG. 12(B) are diagrams explanatory of high-speed reproducing operations in the forward direction between different parts of a disc, to which the present invention is related. FIG. 12(A) is a diagram for explaining a high-speed reproducing operation when the position of the subsequent part accessed from a preceding part is within a predetermined range of the start position of the subsequent part. FIG. 12(B) is a diagram for explaining a high-speed reproducing operation when the position of the subsequent part accessed from a preceding part is out of the predetermined range of the start position of the subsequent part.

FIG. 13(A) is a diagram for explaining a backward high-speed reproducing operation when the position of the subsequent part accessed from a preceding part is within a predetermined range of the start position of the subsequent part. FIG. 13(B) is a diagram for explaining a backward high-speed reproducing operation when the position of the subsequent part accessed from a preceding part is out of the predetermined range of the start position of the subsequent part.

FIG. 14 is a diagram explanatory of operations performed when four sectors are reproduced starting with a sound group SG0 during high-speed reproduction.

FIG. 15 is a diagram explanatory of operations performed when four sectors are reproduced starting with a sound group SG5 during high-speed reproduction.

DESCRIPTION OF THE INVENTION

An embodiment of a recording and reproducing apparatus of a recording medium according to the invention will be described in detail with reference to the accompanying drawings.

Figure 8:
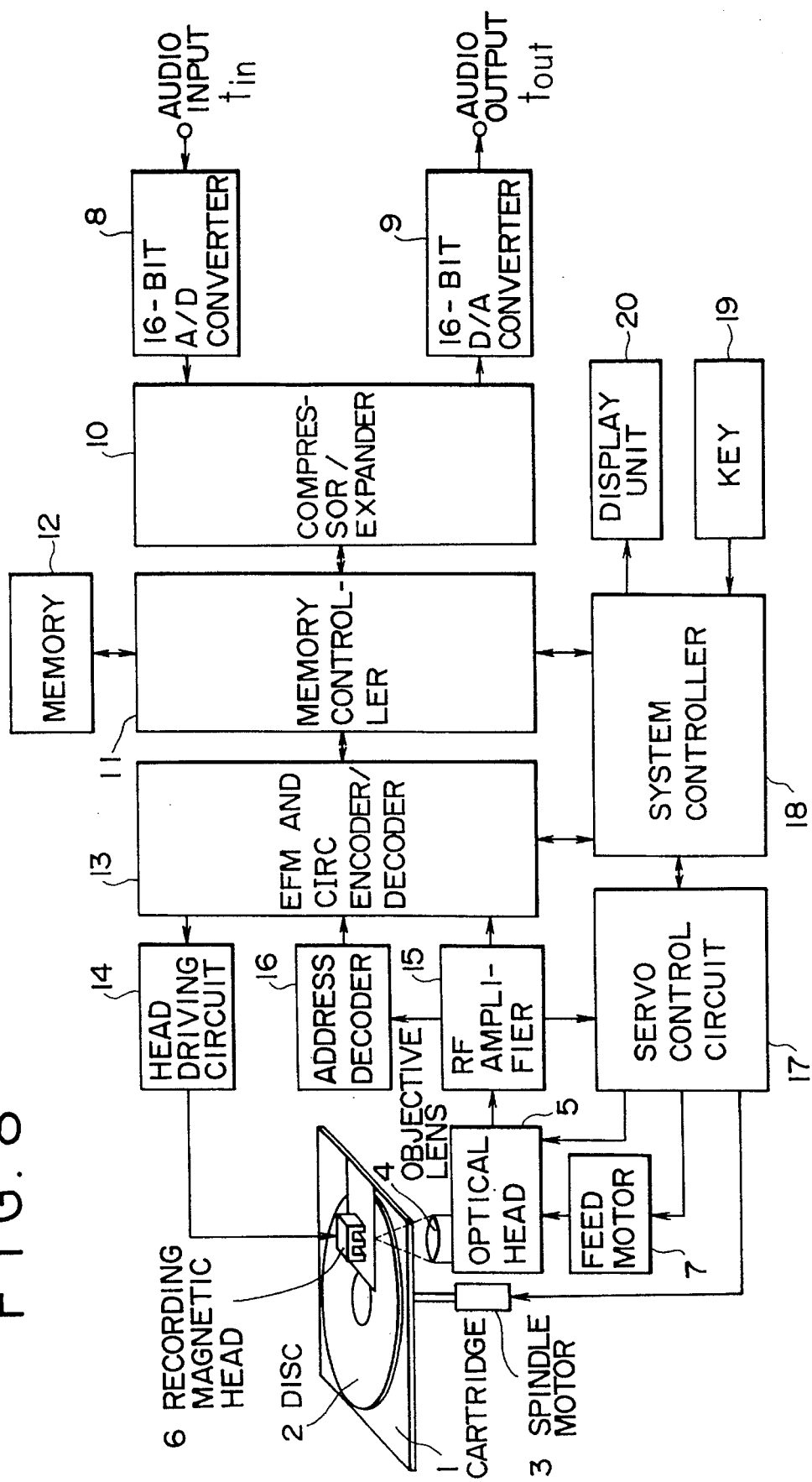
FIG. 8 is a block diagram showing a structure of a disc recording and reproducing apparatus of the present invention.

In the present embodiment, a recording and reproducing apparatus using a magneto-optical disc as the recording medium for recording an audio signal will be described. FIG. 8 shows a block diagram of the apparatus.

Figure 2:
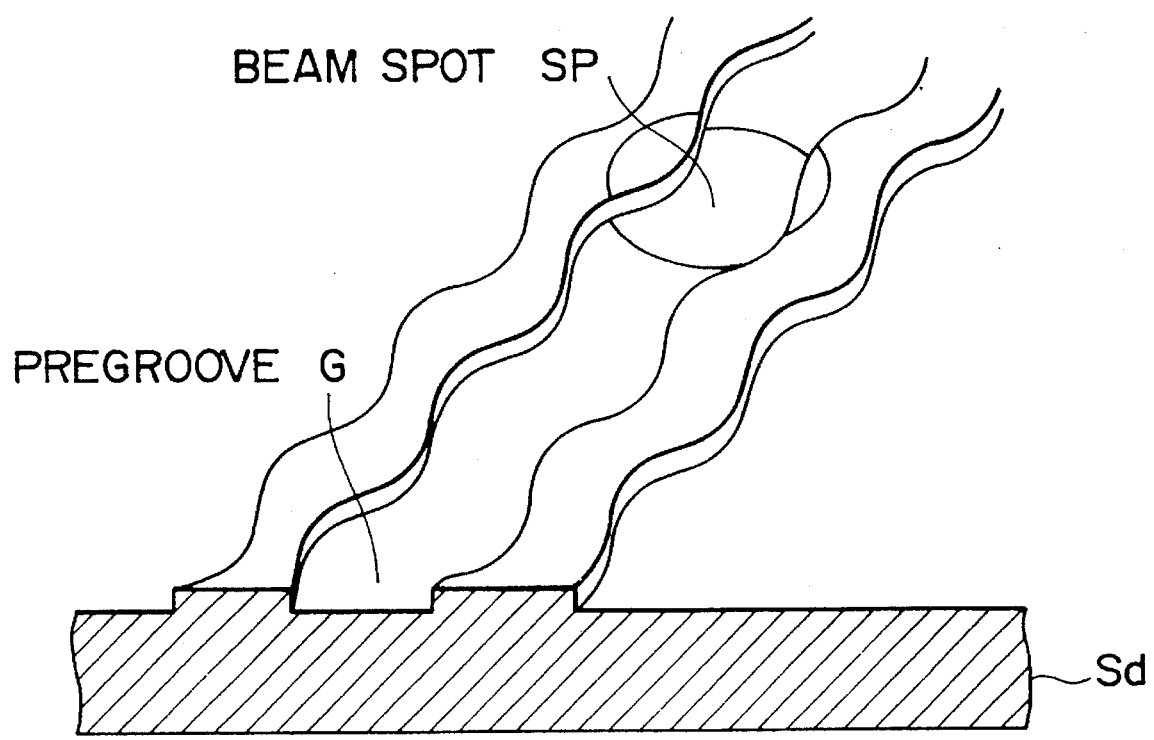
FIG. 2 is an enlarged diagram of a main part of a disc structure, on which the present invention is based.
Figure 3:
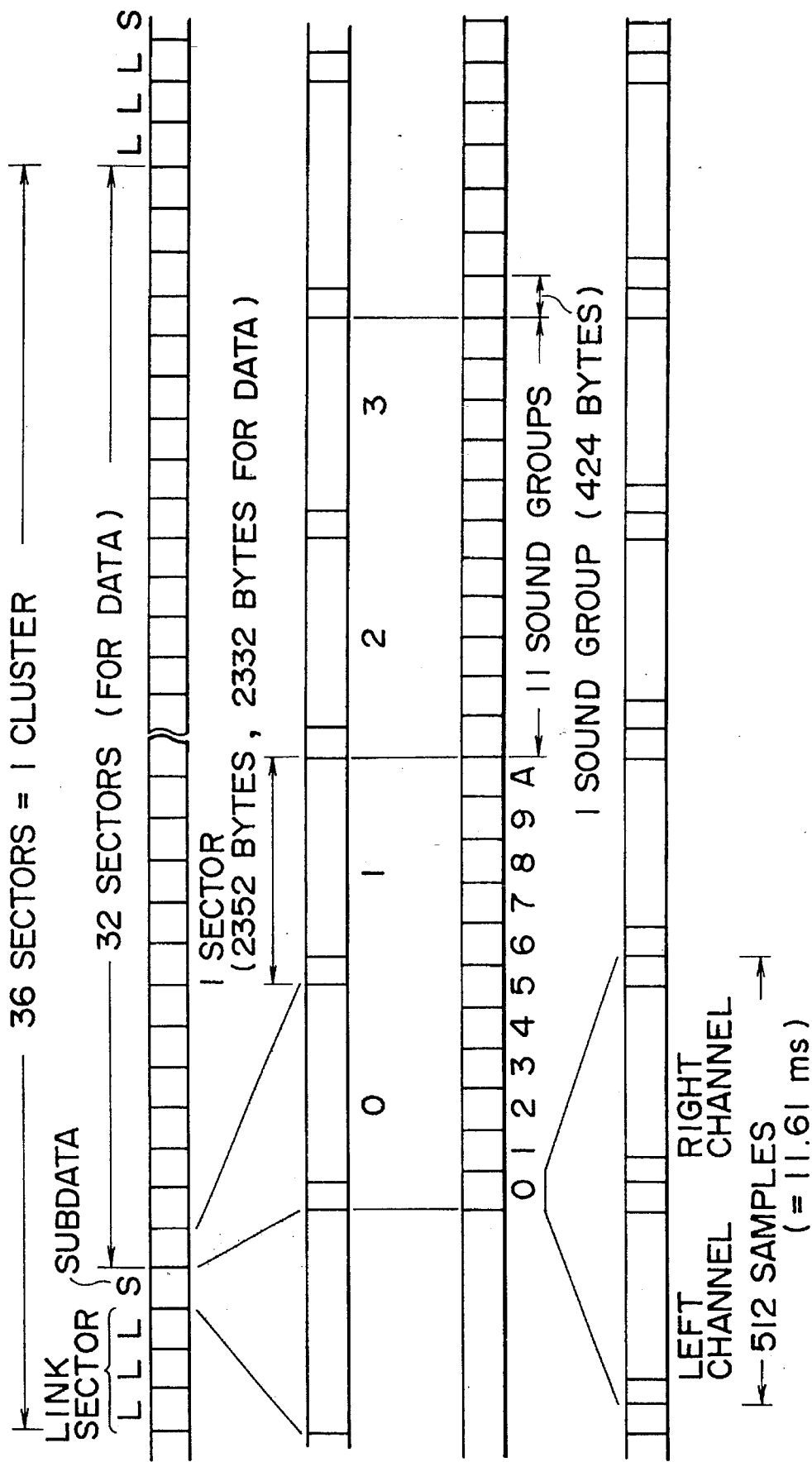
FIG. 3 is a diagram showing a more detailed view of the record format of a disc, on which the present invention is based.
Figure 6:
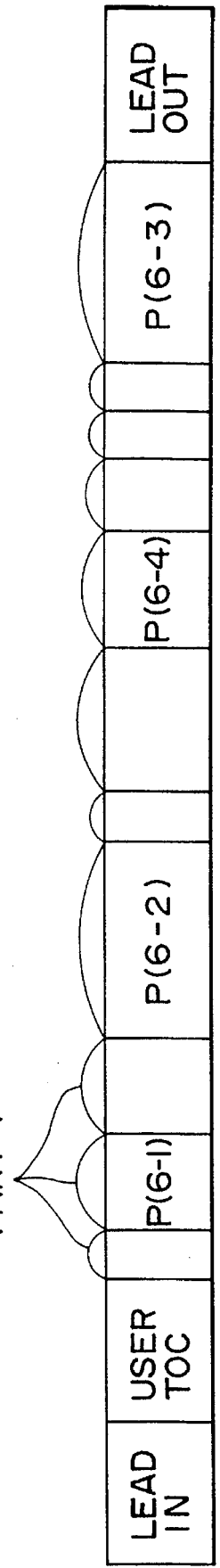
FIG. 6 is a diagram showing a state in which one set of data is discretely recorded on a disc, on which the present invention is based.
Figure 7A:
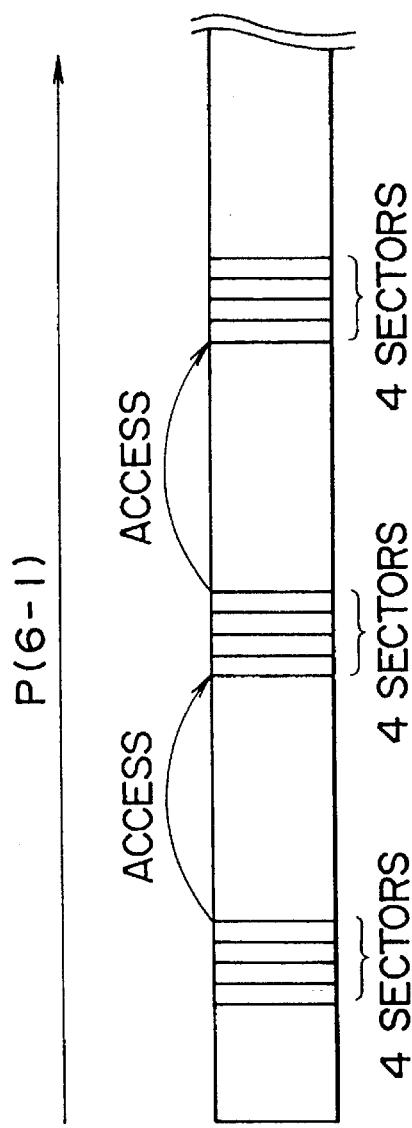
FIG. 7(A) and FIG. 7(B) are diagrams explanatory of high-speed reproducing operations using a disc, on which the present invention is based.
Figure 7B:
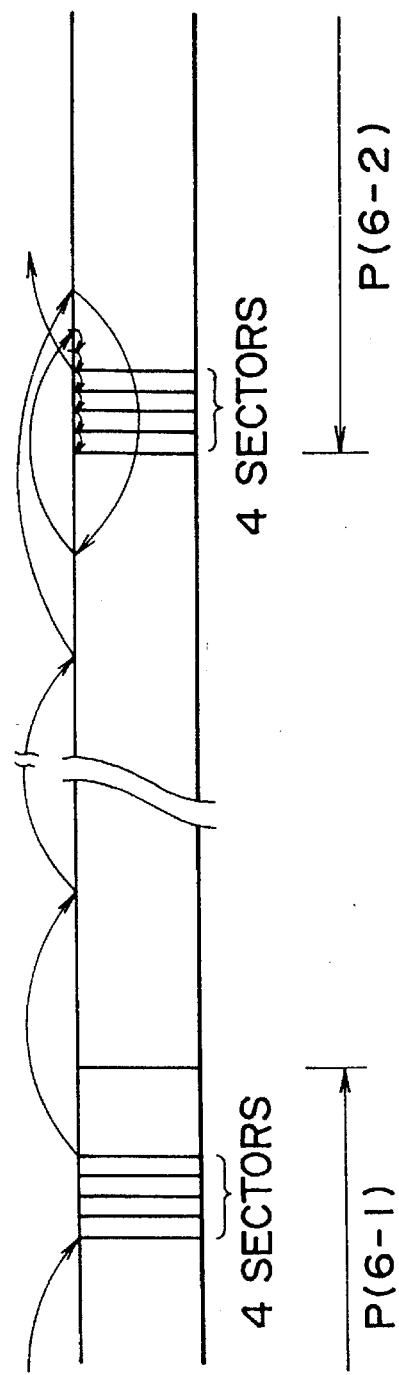

Reference numeral 1 denotes a disc cartridge which contains a magneto-optical disc 2. The disc cartridge 1 is provided with a pair of openings, not shown, formed in the upper and lower side of the disc cartridge body positioned so as to correspond to each other and also provided with a shutter for opening and closing the pair of openings. The shutter is opened and closed with loading/unloading operation of the disc cartridge 1 in the apparatus. The magneto-optical disc 2 includes a disc substrate having a light transmitting property, a recording layer, and a protecting film. In the disc substrate, there is previously formed a spiral pregroove which wobbles in the radial direction of the magneto-optical disc 2 in accordance with address information as shown in FIG. 2. The recording layer is formed in a layer of a magneto-optical recording material such as TbFeCo on the side of the disc substrate where the pregroove is formed. The protecting film is formed over the recording layer using an ultraviolet-curable resin. The magneto-optical disc 2 has a data-recording area and a TOC area. In the data-recording area, data are recorded along the pregroove in accordance with the format shown in FIG. 1 and FIG. 3. In the TOC area, there are recorded title information related to the data or programs recorded in the data-recording area, address data such as start address and end address of each of the data or programs, and information indicative of connective relationships between parts P as small recording areas. The TOC area is read by a later described optical head after a magneto-optical disc has been loaded in the recording and reproducing apparatus and before recording of data into the data-recording area or reproduction of data therefrom. The data read from the TOC area are stored into a storage area provided in a later described system controller or in a dedicated storage area provided within a later described buffer memory. The start address and end address of the TOC area are formed of 24-bit data which corresponds to the recording format as shown in FIG. 3, of which the high-order 14 bits indicate the cluster number, the medium-order 6 bits indicate the sector number, and the low-order 4 bits indicate the sound group number. On the other hand, the pregroove of the magneto-optical disc 2 is wobbled in the radial direction of the disc in accordance with a signal modulated with address data including the cluster number and sector number. By demodulating a signal read from the pregroove, the later described system controller confirms and manages recording position or reproducing position in the recording or reproduction.

Reference numeral 3 denotes a spindle motor which rotationally drives the magneto-optical disc 2 so that its linear velocity is kept constant. On the side at the end of the revolving shaft of the spindle motor 3, there is provided a turntable, not shown. On this turntable is mounted the magneto-optical disc 2 loaded in the recording and reproducing apparatus.

Reference numeral 5 denotes an optical head having an objective lens 4. The optical head 5 includes a laser light source, an optical system constituted of a beam splitter for separating the light beam emitted from the laser light source and the reflected light beam from the magneto-optical disc 2, etc., and a photodetector for detecting the reflected light beam separated by the beam splitter. The objective lens 4 converges the light beam emitted from the laser light source of the optical head 5 on the recording layer of the magneto-optical disc 2 through the disc substrate. The optical head 5 further includes an actuator for driving the objective lens 4 in alignment with the focusing direction and tracking direction. This actuator is supplied with a focusing servo signal and a tracking servo signal from a later described servo control circuit. The objective lens 4 is driven so that a focusing error signal and a tracking error signal are minimized and thereby focusing servo and tracking servo are achieved.

Reference numeral 6 denotes a magnetic head opposite to one of the pair of openings formed in the disc cartridge 1. The magnetic head 6 is disposed in a position to oppose the optical head 5 across the magneto-optical disc 2. The magnetic head 6 generates a vertical magnetic field modulated with recorded data in accordance with a driving signal supplied from a later described head driving circuit and the generated vertical magnetic field is applied to the recording layer from the side of the protecting film of the magneto-optical disc 2. The magnetic head 6 is mechanically associated with the optical head 5, and the magnetic head 6 moves in the radial direction of the magneto-optical disc 2 with the movement of the optical head 5 in the radial direction of the magneto-optical disc 2.

Reference numeral 7 denotes a feed motor, which supplies a driving force to a feed mechanism, not shown, in accordance with a feed signal supplied from the later described servo control circuit so that the optical head 5 is fed in the radial direction of the disc 2.

Reference numeral 8 denotes an A/D (Analog to Digital) converter, which converts an analog input signal such as an analog audio signal input from the input terminal $t_{in}$ into a digital signal at a sampling frequency of 44.1 KHz and a quantization bit number of 16 bits. Although the analog signal input from the input terminal $t_{in}$ is depicted as one channel for simplicity in FIG. 8, it is in reality a stereo signal with two channels, L and R. The signal will hereinafter be treated in the same way.

Reference numeral 9 denotes a D/A (Digital to Analog) converter, which converts a digital audio signal output from a later described compressor/expander into an analog audio signal.

Reference numeral 10 denotes a compressor/expander to which a digital signal such as a digital audio signal output from the A/D converter 8 is supplied. In the compressor/expander 10, the digital signal supplied thereto is compressed for data to approximately 1/5. As the compressing technique used in the compressor/expander 10, modified DCT (modified Discrete Cosine Transform) is used.

The digital data output from the compressor/expander 10 is temporarily stored in a buffer memory 12 through a memory controller 11. As the buffer memory 12, a D-RAM (Dynamic Random Access Memory) with a 4-Mbit storage capacity is used.

The memory controller 11 controls writing of data into the memory 12 and reading of data therefrom. Digital data output from the compressor/expander 10 is written into the memory 12 by the memory controller 11 at a transfer rate of 0.3 Mbit/sec and the digital data stored in the memory 12 is output therefrom at a transfer rate of 1.41 Mbit/sec.

Unless a track jump occurs, i.e., the recording position on the magneto-optical disc 2 jumps due to external disturbance such as vibration, during the recording operation, the memory controller 11 sequentially reads the compressed digital data from the memory 12 at a transfer rate approximately five times as high as the writing speed of the data into the memory 12. The digital data read from the memory 12 is supplied to a later described EFM and CIRC encoder/decoder.

When it is detected that a track jump has occurred while data is being recorded on the magneto-optical disc 2, the memory controller 11 suspends the transfer of data to the later described encoder/decoder and allows the compressed data from the compressor/expander 10 to be stored in the memory 12. Then, the memory controller 11 controls writing of data into the memory 12 and reading of data therefrom so that the transfer of digital data to the later described encoder/decoder from the memory 12 is resumed after the irradiated position on the magneto-optical disc 2 by the light beam emitted from the optical head, i.e., the recording position, has been corrected. The correction of the recording position is performed on the basis of the address data recorded on the magneto-optical disc 2.

Detection as to whether or not a track jump has occurred is achieved by installing a shock detector in the apparatus and by having it determined by the later described system controller whether or not a vibration being detected by the shock detector is of such magnitude as to cause a track jump. Since the address data is recorded along the pregroove formed in the magneto-optical disc 2 as described above, a track jump can also be detected by having the address data read during the recording and causing the later described system controller to monitor the continuity of the address data being decoded. Further, it is also possible to detect a track jump by having the function of logical OR (logical sum) performed on the data from the shock detector and the continuity of the address data. When a track jump occurs, the optical head 5 is controlled by the later described system controller so that the output level of the light beam incident on the magneto-optical disc 2 from the optical head 5 is lowered to a level at which the light beam is unable to record, or the output level is reduced to zero.

In the case described above, a recording capacity of memory 12 is required which is at least capable of storing compressed digital data corresponding to the period of time from occurrence of a track jump to the restoration of the recording position to its correct position. A 4-Mbit DRAM is used as the memory 12 in the present example and this capacity satisfies the above condition.

During the recording operation, the memory controller 11 controls writing into and reading out of the memory 12 such that the data stored in the buffer memory 12 in the normal operation may become as small as possible. More specifically, control is executed, when the data amount stored in the buffer memory 12 exceeds a predetermined amount, so that a predetermined amount of data, for example one cluster of data, is read out of the buffer memory 12 and, thereby, a storable area above a predetermined data amount is secured in the buffer memory 12 at all times.

Digital data read out of the memory 12 by the memory controller 11 is supplied to an EFM and CIRC encoder/decoder 13. In this encoder/decoder 13, error detection and correction encoding is applied to the data and also modulation processing suitable for recording, EFM (Eight to Fourteen Modulation) in this example, is applied to the data. As the error detecting and correcting code, CIRC (Cross-Interleave Reed-Solomon Code) with a modified interleave system for compact disc (CD) is used.

The record data output from the encoder/decoder 13 is supplied to a head driving circuit 14. In the head driving circuit 14, a driving signal of the magnetic head 6 is generated on the basis of the record data and this driving signal is supplied to the magnetic head 6.

Reference numeral 15 denotes an RF amplifier, which is supplied with an output signal from the photodetector of the optical head 5. The RF amplifier 15, on the basis of the output signal from the photodetector of the optical head 5, generates an RF signal as a read signal of the magneto-optical disc 2. Since a magneto-optical disc is used as the recording medium in the present embodiment, the RF signal is output from the RF amplifier 15 in accordance with differences in the angle of Kerr rotation of the light beam reflected from the recording layer on the magneto-optical disc. The RF signal is supplied to the encoder/decoder 13. The RF amplifier 15, further, generates a focusing error signal from the output signal of the photodetector according to the so-called astigmatic method. The RF amplifier 15 also generates a tracking error signal on the basis of the output signal from the photodetector according to the so-called three-spot method. Further, the RF amplifier 15 generates a detection signal of the wobbled pregroove by using a push-pull method, i.e., generates a push-pull signal, and supplies the signal to a later described address decoder. For the astigmatic method, refer for example to U.S. Pat. No. 4,023,033. For the three-spot method, refer for example to U.S. Pat. No. 3,876,842. For the push-pull method, refer for example to U.S. Pat. No. 3,909,608. The focusing error signal and tracking error signal generated by the RF amplifier 15 are supplied to the later described servo control circuit. The RF amplifier 15 supplies the RF signal generated thereby to the later described servo control circuit so that a spindle servo signal is generated therein.

Reference numeral 16 denotes an address decoder to which the push-pull signal generated by the RF amplifier 15 is supplied. The address decoder 16 outputs address data by FM demodulating the push-pull signal supplied thereto. The address data obtained by the demodulation is supplied to the encoder/decoder 13 to be decoded therein. Address information decoded is supplied to the later described system controller for its recognition of the recording position or reproducing position during the recording or reproduction and position control. Further, a sync signal extracted from the address data decoded by the address decoder 16 is supplied to the later described servo control circuit.

Reference numeral 17 denotes a servo control circuit, to which the focusing error signal and tracking error signal from the RF amplifier 15, and the RF signal or the sync signal extracted from the address data are supplied. The servo control circuit 17 generates, from these signals, the focusing servo signal, tracking servo signal, and the spindle servo signal. The focusing servo signal and tracking servo signal are supplied to the actuator of the optical head 5. The spindle servo signal is generated on the basis of either the RF signal or the sync signal extracted from the address data. The spindle servo signal is supplied to the spindle motor 3 to control its rotation so that the magneto-optical disc 2 is rotated to provide a constant linear velocity. Further, the servo control circuit 17 generates a feed signal. The feed signal is generated by the servo control circuit 17 on the basis of the low-frequency component of the tracking error signal. The feed signal is supplied to the feed motor 7 and the feed motor 7, in turn, supplies a drive force in accordance with the supplied feed signal to a feed mechanism, not shown, so that the optical head 5 and magnetic head 6 are fed in the radial direction of the magneto-optical disc 2 keeping pace with the scanning by the light beam from the optical head 5 along the recording track of the magneto-optical disc 2. The servo control circuit 17 generates an access signal in response to an access instruction issued from the later described system controller and supplies it to the feed motor 7. Then, the feed motor moves the optical head 5 and magnetic head 6 in the radial direction of the magneto-optical disc 2 by an amount corresponding to the access signal.

Reference numeral 18 denotes a system controller, which is constituted of a microcomputer. The system controller 18 is connected with an input unit 19 and a display unit 20. The system controller 18, in response to input signals from the input unit 19, generates control signals for having the reproducing or recording operation started and stopped, the accessing operation made, and the like and, further, controls the operations of the parts of the recording and reproducing apparatus, such as the servo control circuit 17, encoder/decoder 13, and the memory controller 11, and the recording and reproducing apparatus as a whole.

The input unit 19 includes a plurality of control keys such as a power key for ON/OFF control of the power supply of the apparatus, a reproducing key to start a reproducing operation, a record key to start a recording operation, a stop key to stop the recording or reproducing operation, a key for having the accessing operation made, and the like.

The display unit 20 uses such a display device as a liquid crystal display or fluorescent character display tube. The display unit 20 is supplied with a display control signal generated by the system controller 18 on the basis of the data recorded in the TOC area of the magneto-optical disc 2 (hereinafter referred to as TOC data). In accordance with the display control signal, the display unit 20 displays time information, such as the total reproducing time of the magneto-optical disc 2, elapsed time of the program being reproduced, and remaining time of the program being reproduced, the track number of the program being reproduced, and the like. Further, in the case where title information such as the title of the disc itself and the title of each program and data related to recorded date and time of the programs are recorded in the magneto-optical disc 2, such data are selectively displayed on the display unit 20.

The output level of the light beam emitted from the optical head 5 is controlled in accordance with a control signal supplied from the system controller 18. During the recording, the output level of the light beam from the optical head 5 is held at an output level high enough to achieve recording. When it is recognized that a track jump has occurred by the system controller 18 as described above, the output level is immediately lowered to an output level at which the recording is impossible or to the zero output level.

Recording operation of the recording and reproducing apparatus structured as described above will be described below.

When the record key of the input unit 19 is operated, the system controller 18 issues a control signal to start each part. An input signal input from the input terminal $t_{in}$, for example an analog audio signal, is converted to a 16-bit digital signal, a digital audio signal, by the A/D converter 8. The digital audio signal is supplied to the compressor/expander 10 and compressed for data to approximately 1/5 in data quantity, and then temporarily stored in the memory 12 through the memory controller 11. The digital data temporarily stored in the memory 12 is read by the memory controller 11 and supplied to the encoder/decoder 13. The digital data supplied to the encoder/decoder 13 is subjected therein to the EFM processing and error detection and correction coding processing and converted to record data. The record data is supplied to the magnetic head 6 through the head driving circuit 14. The magnetic head 6 applies a vertical magnetic field modulated with the record data to the magneto-optical disc 2. At this time, a light beam from the optical head 5 at the output level necessary for recording is incident on the magneto-optical disc 2 from its disc substrate side. As a result, the recording layer of the magneto-optical disc 2 is heated above the Curie temperature by irradiation of the light beam from the optical head 5, while it is under application of the vertical magnetic field from the magnetic head 6. Thereafter, with the relative movement between the light beam and the magneto-optical disc 2, the temperature of the recording layer is lowered below the Curie temperature. At this time, the direction of magnetization of the recording layer is changed and fixed in accordance with the direction of the vertical magnetic field applied by the magnetic head 6 to the magneto-optical disc 2 and, thereby, the data is recorded. Thus, an approximately 2-second portion (1 cluster) of the original analog audio signal is recorded on the magneto-optical disc 2 in approximately 0.4 second.

When it is detected by the system controller 18 that a track jump due to external disturbance or the like has occurred during the recording operation, the output level of the light beam emitted from the optical head 5 is immediately lowered and at the same time the supply of the record data to the magnetic head 6 is stopped. Until the access of the light beam emitted from the optical head 5 to its original position before occurrence of the track jump is completed, the input signal input from the input terminal tin is stored in the memory 12. When the access of the light beam has been completed, the output level of the light beam emitted from the optical head 5 is raised to the recording level and, at the same time, the supply of the record data to the magnetic head 6 is resumed and, thus, the recording operation is resumed.

The position of the data-recording area of the magneto-optical disc 2 at which the recording is to be started is determined by the system controller 18 on the basis of the TOC data stored in a storage area within the system controller 18 or the memory 12.

Before the disc cartridge 1 is ejected from the recording and reproducing apparatus when the recording of all the record data on the magneto-optical disc 2 has been finished or after the stop key of the input unit 19 has been operated, the TOC data recorded in the TOC area of the magneto-optical disc 2 is updated and, after the updating, the disc cartridge 1 is ejected.

Below will be described the reproducing operation of the recording and reproducing apparatus. When the disc cartridge 1 is loaded into the recording and reproducing apparatus, the spindle motor 3 starts to rotate and the focusing servo and tracking servo are made ready to pull in, and then the TOC area of the magneto-optical disc 2 is read by the optical head 5. At this time, the output level of the light beam emitted from the optical head 5 is set at a level not capable of recording of the record data. The TOC data read by the optical head 5 is stored in the storage area within the system controller 18 or in the storage area within the memory 12.

Then, the optical head 5 is brought to the data-recording area of the magneto-optical disc 2 and caused to read data recorded in the data-recording area. The output signal from the photodetector of the optical head 5 is supplied to the RF amplifier 15. In the RF amplifier 15, the above described error signals as well as the RF signal are generated. The error signals are supplied to the servo control circuit 17 and the respective servo signals are generated in the servo control circuit 17 for performing focusing servo, tracking servo, and spindle servo. The RF signal is supplied to the EFM and CIRC encoder/decoder 13 and subjected therein to EFM demodulation and error correction processing. Address data decoded by the address decoder 16 is supplied to the system controller 18 through the encoder/decoder 13. The system controller 18, on the basis of the address data supplied thereto, controls the reproducing position of the optical head 5 in the radial direction of the magneto-optical disc 2. The system controller 18 manages the reproducing position along the recording track of the magneto-optical disc 2 scanned by the optical head 5.

The digital data output from the encoder/decoder 13 is temporarily written into the memory 12 through the memory controller 11. Unless a track jump, i.e., displacement of the reproducing position due to vibration or the like, occurs during the reproducing operation, the memory controller 11 writes the digital data into the memory 12 and reads the digital data stored in the memory 12 at a transfer rate of 0.3 Mbit/sec. The memory controller 11 controls the writing of the digital data into the memory 12 such that the data amount stored in the memory 12 does not fall below a predetermined amount.

When it is detected by the system controller 18 that a track jump has occurred, the system controller 18 stops writing of the digital data output from the encoder/decoder 13 into the memory 12 and controls the memory 12 so that only the transfer of the digital data from the memory 12 to the compressor/expander 10 is performed. Thereafter, the memory controller 11 controls the memory 12 so that the writing operation of the digital data from the encoder/decoder 13 into the memory 12 is resumed after the correction of the irradiated position by the light beam from the optical head 5 on the disc, i.e., the reproducing position, has been completed. During the period from start to completion of the correction of the reproducing position, the digital data stored in the memory 12 is read and decoded and output from the output terminal $t_{out}$.

The digital data read from the memory 12 is supplied to the compressor/expander 10 to be subjected to expansion processing of the digital data. The digital audio signal output from the compressor/expander 10 is supplied to the D/A converter 9 to be converted into an analog audio signal and this signal is supplied through the output terminal $t_{out}$ to an external amplifier circuit or the like.

While normal reproducing operations are performed in the reproduction, the memory controller 11 controls the writing of data into the memory 12 so that an amount of data is stored in the memory 12 which is larger than that corresponding to the time required for correction of the reproducing position of the light beam emitted from the optical head 5. When the data amount in the memory 12 decreases below a predetermined data amount, the memory controller 11 causes the system controller 18 to generate a control signal so that data are intermittently read from the magneto-optical disc 2 by the optical head 5 and the digital data from the encoder/decoder 13 is written into the memory 12. Supposing that a D-RAM having a 1-Mbit storage capacity is used for the memory 12, it takes approximately 0.9 second to fill memory 12 with digital data and this digital data corresponds to an analog signal of approximately 3 seconds. Namely, when the memory 12 is filled with digital data, a reproducing signal can be continued to be output for approximately 3 seconds even if no output signal from the optical head 5 read from the magneto-optical disc 2 is supplied in the meantime due to external disturbance, vibration, or the like. Since a D-RAM having a 4-Mbit storage capacity is used as the memory 12 in the present embodiment, a reproducing signal can be continued to be output for approximately 12 seconds. By causing, in the meantime, the optical head 5 to access again the position on the disc irradiated by it, i.e., the reproducing position, before a track jump occurred and to resume the reading of data from the magneto-optical disc 2, the reproducing signal output from the output terminal $t_{out}$ is prevented from being interrupted.

Figure 9:
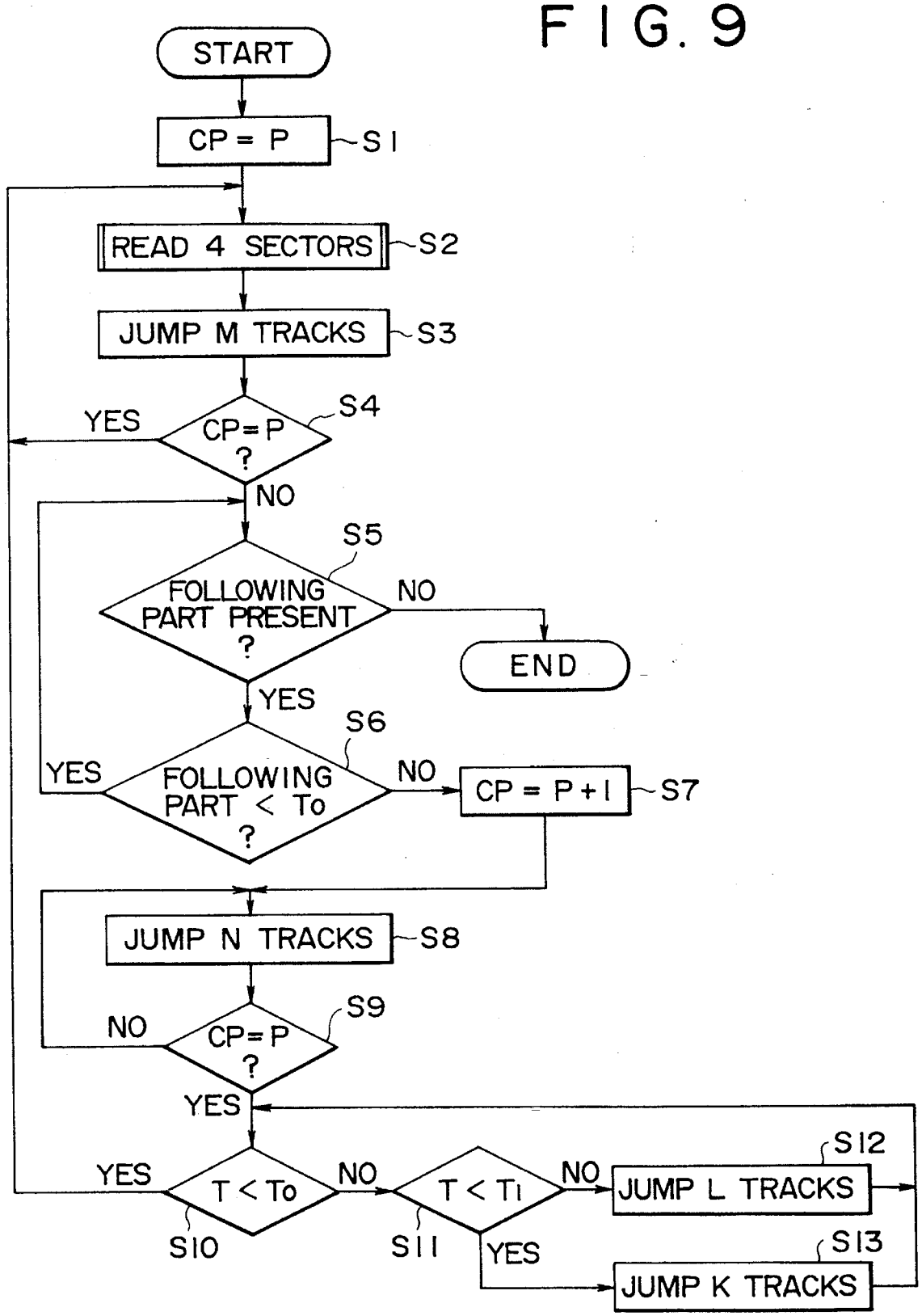
FIG. 9 is a flowchart explanatory of a high-speed reproducing operation in a disc recording and reproducing apparatus of the present invention.
Figure 10:
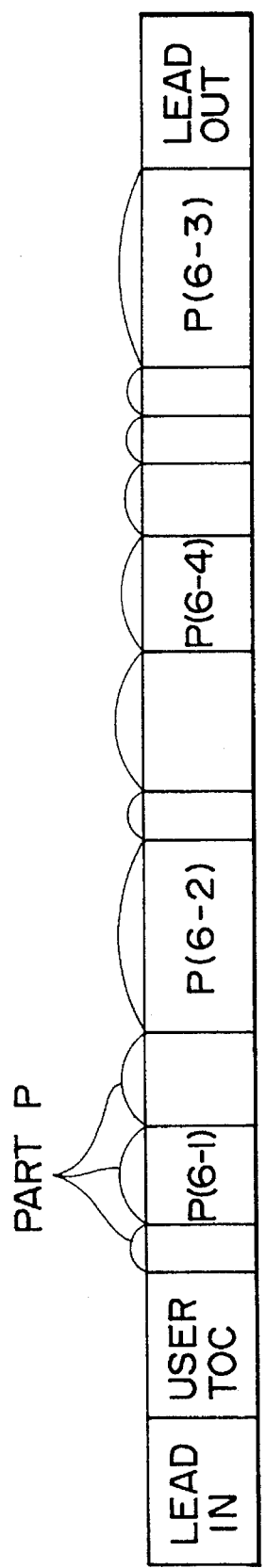
FIG. 10 is a diagram showing a state in which one set of data is discretely recorded in several parts on a disc, to which the present invention is related.

Referring now to the flowchart of FIG. 9, operations in the recording and reproducing apparatus during high-speed reproduction in the case where a program is recorded on the disc 2 for example as shown in FIG. 10. The program executing the processes shown in FIG. 9 is previously stored in a ROM (not shown) incorporated in the system controller 18.

First, in step S1, the value p of the part P, in which the position irradiated by the light beam, i.e., the reproducing position, is located on the disc 2 being currently reproduced by the optical head 5, is set as a variable CP, thus CP=p. Then, in step S2, the signal of a four-sector portion of that part is read. The signal of the four-sector portion is supplied to the memory 12 and temporarily stored therein. Then, it is read at predetermined timing and output from the D/A converter 9.

Details of the operation of reading the four-sector signal will be described later with reference to FIGS. 16 and 17.

In step S3 following step S4, an M-track jump, for example a 10-track jump, of the reproducing point is executed. More specifically, the system controller 18 at this time controls the optical head 5 through the servo control circuit 17 so that the reproducing point is caused to access for example the 10th track from the current position toward the outer circumference of the disc 2. Then, in step S4, it is determined whether or not the part P in which the reproducing point is located now after the access has the value equal to the value p stored in step S1 for the variable CP. More specifically, it is determined whether or not the reproducing point reached after the access is in the same part as the part subjected to the current high-speed reproduction.

Figure 11:
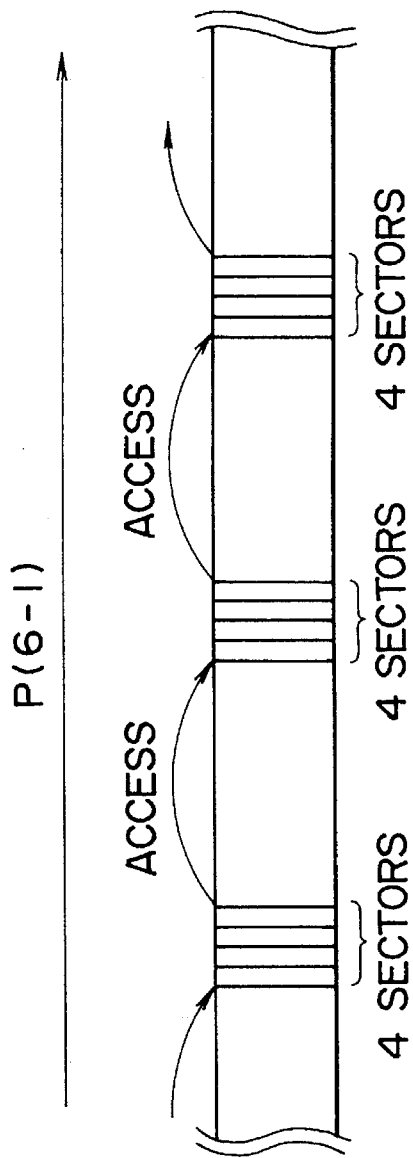
FIG. 11 is a diagram explanatory of a high-speed reproducing operation performed within the same part of a disc, to which the present invention is related.

When it is in the same part as the part under the current high-speed reproduction, the flow returns to step S2 as shown in FIG. 11 and a reading operation of a four-sector portion is performed. When, as described above, the position reached after the access is located in the same part, the operations in step S2 to step S4 are repeated. In other words, the operations to jump over 10 tracks and, then, to read and reproduce a signal in four sectors starting at the accessed position are repeated.

When, in step S4, it is determined that the reproducing point has gotten out of the current part P, step S5 is followed, in which it is determined whether or not a part P is present, in which part the audio signal subsequent to the audio signal recorded in the part P and reproduced so far is recorded, according to the TOC information retained in the system controller 18 or the memory 12. When there is present no subsequent part P, the high-speed reproducing operation is ended because the high-speed reproducing operation of the program is completed.

When there is present a subsequent part P, the flow moves from step S5 to step S6, in which it is determined whether or not the length of the subsequent part P is smaller than a predetermined reference value T0, for example a 10-track length. When the length of the part P is smaller than the reference value T0, the flow returns to step S5, in which it is determined whether or not there is present a further subsequent part P according to the TOC information. More specifically, when the length of a part P is smaller than the reference value T0, the high-speed reproduction of this part P is omitted and the reproducing point is moved to a part P subsequent to that part P. The reason for this is that, when the reference value T0 is set at a 10-track length, the data amount of the 10-track portion corresponds to approximately a 2-second portion in terms of the analog signal output from the output terminal, and accordingly the data amount of the part P smaller than 10 tracks is less than that, and, hence, whether such a part P is reproduced or not does not affect so much the high-speed reproduction.

When it is determined in step S6 that the length of the part is equal to or larger than the reference value T0, the flow advances to step S7, in which the value p+1 of the subsequent part P (for example the part number or address data such as the start address and end address of the part P) is set as the variable CP. Step S7 is followed by step S8, in which an N-track jump, for example a 100-track jump, is performed. The value N is set at a larger value than the jumped track number M in step S3 because this jump is for searching a subsequent part P.

After the N-track jump has been performed in step S8, the flow advances to step S9, in which it is determined whether or not the reproducing point reached after the jump is in the same part P as that set for the variable CP in step S7 according to the TOC information similarly to the above. When the accessed part P is not equal to the part P set for the variable CP in step 7, the flow returns to step S8, in which another N-track jump is performed. In this way, operations in steps S8 and S9 are repeated until the reproducing point arrives in the part P set as the part to be searched in step S7.

When the reproducing point arrives in the searched part P as the result of the repeated N-track jump, the flow advance from step S9 to step S10, in which it is determined whether or not the position of the reproducing point reached after the access is within the reference value T0. When the position of the reproducing point reached after the access is within the reference value T0, the flow returns from step S10 to step S2, in which reading of four sectors is performed. Namely, when the position of the reproducing point after the access is within the reference value T0, the high-speed reproducing operation of the part P is resumed from that point reached after the access, not further searching the start point of the part P.

When it is determined in step S10 that the position reached after the access is outside the reference value T0, the flow advances to step S11, in which it is determined whether or not the reached position after the access is within a second reference value T1, i.e., smaller than for example a length of 50 tracks. When the distance T, i.e., the distance from the position of the starting point of the subsequent part P to the position of the reached point, is longer than the length T1, the flow advances to step S12, in which an L-track jump, for example a 50-track jump, is performed, and then the flow returns to step S10.

In step S10, it is determined again whether or not the reached position after the access is within the range of the reference value T0 of the part P. When the reached position reached after the access is not within the range of the reference value T0, the flow advances to step S11 again. Thus, the L-track jump is repeated until the aforesaid distance T comes within the range of the length T1. When it is determined in step S11 that the distance T comes within the range of the length T1, the flow moves to step S13, in which a K-track jump, for example a 10-track jump is performed. That is, the number of tracks to be jumped over for accessing is decreased. Then, the flow returns to step S10.

Thus, the K-track jump is repeated until the reached position after the access comes within the range of the reference value T0, and when the reached position comes within the range of the reference value T0, the flow returns to step S2, and the high-speed reproducing operation is resumed from that position. Also in this case, the high-speed reproducing operation is started from the position within the range of the reference value T0, not further searching the starting point of the part P. Therefore, sound is prevented from being interrupted during the high-speed reproducing operation.

The above high-speed reproducing operation will further be described with reference to FIG. 10 to FIGS. 12(A) and 12(B). Now suppose that digital audio data corresponding to an analog signal of the program number 6 are discretely recorded in four parts from the part P(6-1) to part P(6-4) as shown in FIG. 10.

When the reproducing points remain within the same part, for example the part P(6-1), the operation making an M-track jump (10-track jump) and then reproducing four sectors is repeated as shown in FIG. 11.

On the other hand, when the reproducing point, after a reproducing operation of four sectors of digital data has been performed in the part P(6-1) and then a 10-track jump has been made, reaches a position beyond the end address A1E of the part P(6-1) as shown in FIG. 12(A), the part P(6-2) subsequent to the part P(6-1) is searched. When the address of the reached position after repeating the accessing operation some times comes within the range of the subsequent part P(6-2), if the distance T from the address A2S of the starting point of the part P(6-2) to the position reached after the access is shorter than the reference value T0, the high-speed reproducing operation to reproduce data of four sectors is immediately started from the reached position a.

However, when the distance T from the reached position b in the part P(6-2) reached after the access and the address A2S of the starting point of the part P(6-2) is longer than the reference value T0 as shown in FIG. 12(B), an accessing operation in the backward direction is performed until the reached position b after the access comes within the range of the reference value T0. When the reached position b comes within the range of the reference value T0, a reproducing operation of the data of four sectors is resumed from that position.

Figure 13A:
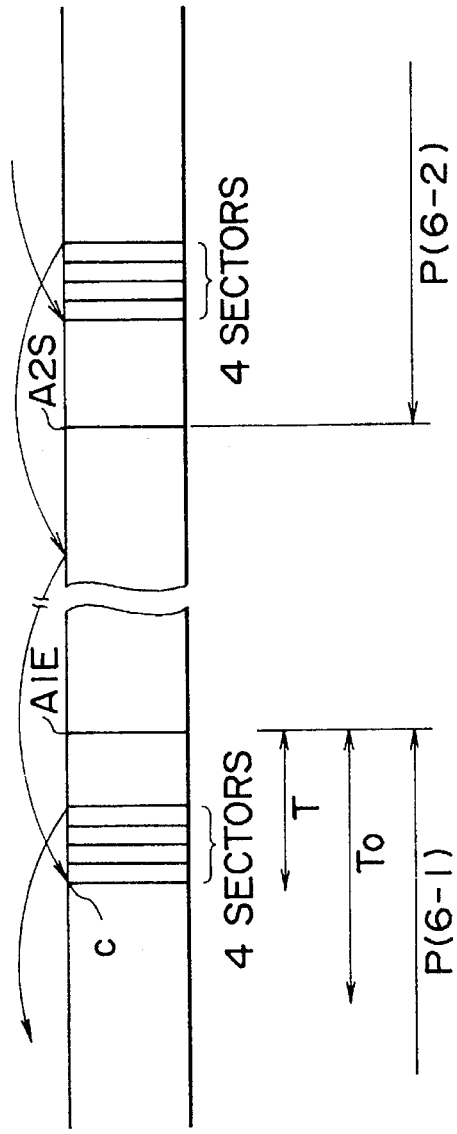
FIG. 13(A) and FIG. 13(B) are diagrams explanatory of high-speed reproducing operations in the backward direction between different parts of a disc, to which the present invention is related.

Although the cases in which high-speed reproducing operations are performed in the forward direction, i.e., in the direction from the inner circumference to the outer circumference of the disc, were shown in FIG. 11 and FIG. 12(A) and FIG. 12(B), similar processing is performed when the high-speed reproducing operation is performed in the backward direction, i.e., in the direction from the outer circumference to the inner circumference of the disc. More specifically, when a 10-track jump has been made following a high-speed reproducing operation of the part P(6-2) has been made, if the address after the access gets out of the part P(6-2) as shown in FIG. 13(A), the address A1E of the end point of the part P(6-1) preceding the part P(6-2) is searched. When the address of the point reached after repeating the accessing operation some times comes within the range of the part P(6-1), if the distance T as the difference between the address of the position c reached after the access and the address A1E of the end point of the part P(6-1) is within the range of the reference value T0, a high-speed reproducing operation in the backward direction is immediately started from the position c reached after the access.

Figure 13B:
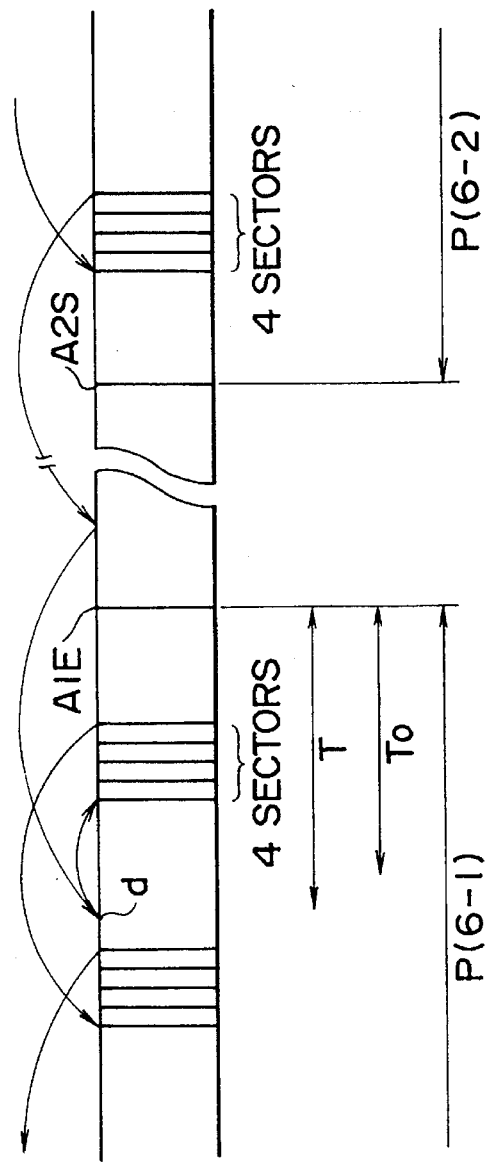

If the distance T as the difference between the address of the position d reached after the access and the address A1E of the end point of the part P(6-1) is over the reference value T0 as shown in FIG. 13(B), accessing operations are performed until the distance comes within the range of the reference value T0. When the position d reached after the access comes within the range of the reference value T0, the high-speed reproducing operation in the backward direction is resumed from this position.

As described above with reference to FIG. 3, 11 sound groups are assigned to 2 consecutive sectors in the magneto-optical disc 2. Accordingly, as shown in FIG. 14, the sixth sound group SG5 of the 11 sound groups from SG0 to SGA is located so as to connect both sectors at an even-numbered address and at an odd-numbered address. Accordingly, in one portion of the sound group SG5, there is recorded a portion of data recorded in the sector at an even-numbered address and, in the other portion, there is recorded a portion of data recorded in the sector at an odd-numbered address. In each sector, there is recorded a header address consisting of a cluster address in three digits and a sector address in two digits. By reading the header address, it can be judged whether the sector is that at an even-numbered address or that at an odd-numbered address. A pair of sectors is formed of an even-numbered sector and an odd-numbered sector and 11 sound groups SG0 to SGA are recorded as one processed unit in the pair of sectors.

When four sectors are reproduced in the high-speed reproducing operation, if the four sectors start with the sound group SG0 at an even-numbered address, i.e., the sector α to the sector δ are reproduced as shown in FIG. 14, there is produced no problem in the subsequent data processing. This is because the reproduction can be preformed by sequentially reading the data from the sector α to the sector δ.

However, it is not always so that the position reached as the result of access is where a sector at an even-numbered address starts as shown in FIG. 14. If sectors starting with the sound group SG5 at an odd-numbered address as shown in FIG. 15 are to be reproduced, there arises a problem. When the four sectors starting with the sector β and ending with the sector α as shown in FIG. 15 are to be reproduced, the data of the sound group SG5 of the sector γ can be reproduced by reading the sound group SG5 of the following sector δ, but as for the sound group SG5 of the sector β and the sound group SG5 of the sector α, the data of the remaining sound group SG5 cannot be read and reproduced.

The transfer of data between the memory 12 and the encoder/decoder 13 is performed dealing the 11 sound groups starting with the sector at an even-numbered address, i.e., the sound groups SG0 to SGA, as one fundamental unit. Therefore, in the high-speed reproducing operation, if data of four sectors starting with a sound group SG5, i.e., start with a sector at an odd-numbered address as shown in FIG. 15, the data of each sound group SG5 of the first sector and the last sector, i.e., of the sector α and the sector β in FIG. 15, will be dropped. When the data in the sound groups SG5 are dropped abnormal sounds are generated on account of the portions lacking the data.

Figure 16:
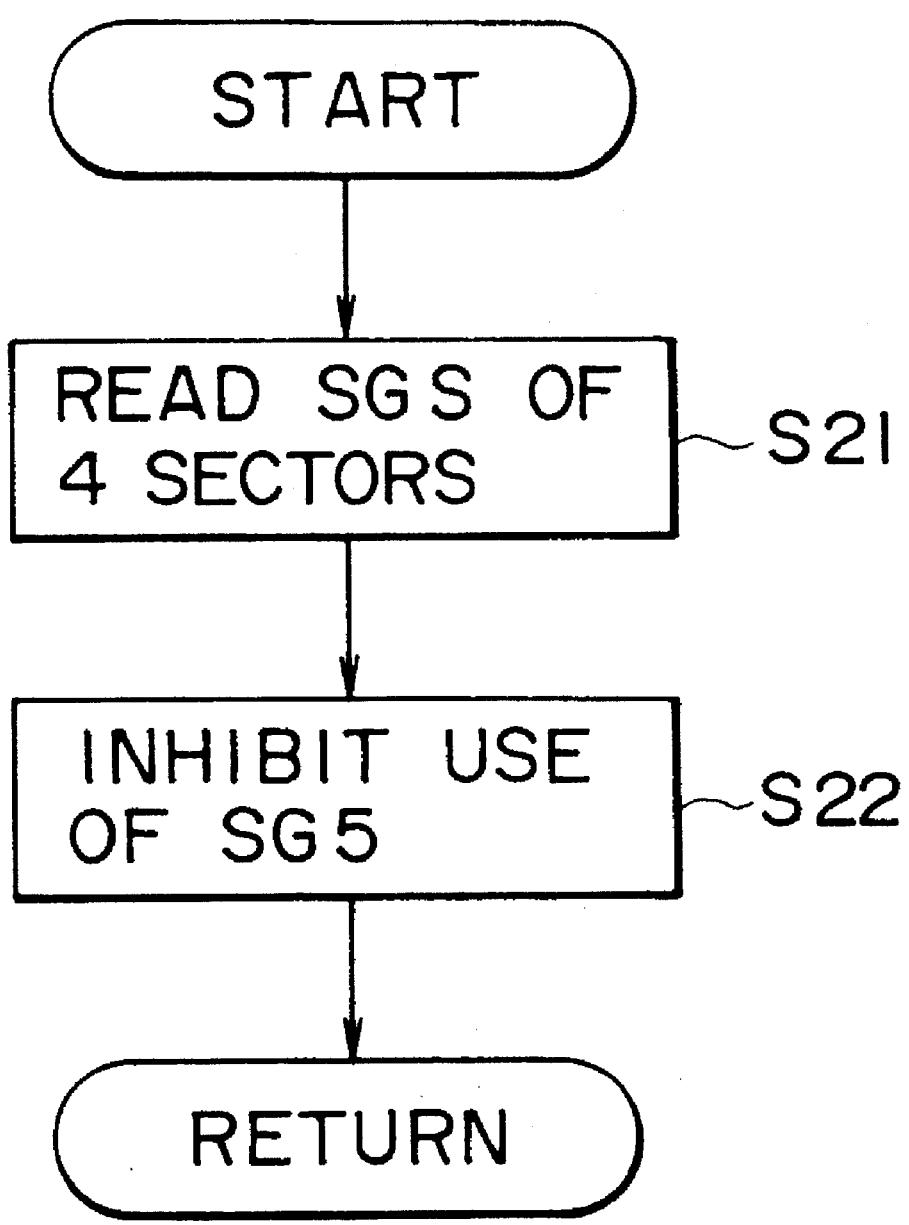
FIG. 16 is a flowchart explanatory of a sequence of operations for reading four sectors during high-speed reproduction.
Figure 17:
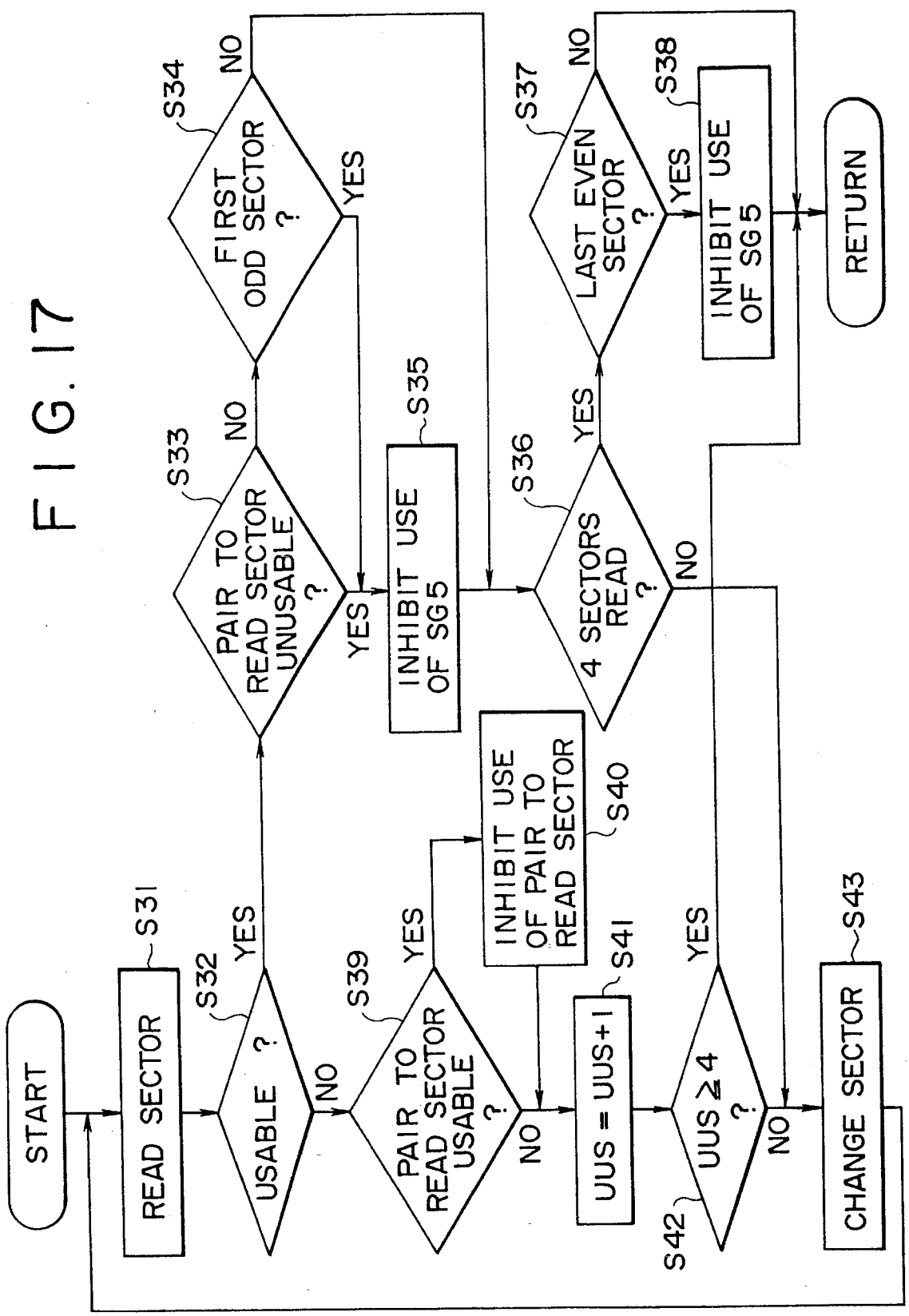
FIG. 17 is a flowchart explanatory of another sequence of operations for reading four sectors during high-speed reproduction.

Therefore, the reading processing of four sectors in the high-speed reproducing operation in step S2 of FIG. 9 is performed such that data of four sectors are read as shown in step S21 of FIG. 16 and, then, the data of the sound group SG5 is not used for generation of the reproducing signal in step S22 but the reproducing signal is generated using only the signals of the remaining sound groups SG. By so doing, the occurrence of abnormal sounds can be suppressed even in the case where four sectors starting with a sector at an odd-numbered address as shown in FIG. 15 are read, not to mention the case where four sectors starting with a sector at an even-numbered address as shown in FIG. 14 are read. Whether a sector is that at an even-numbered address or that at an odd-numbered address can be judged according to the address of the sector. Therefore, it is adapted such that, in the case of a sector at an even-numbered address, the data of the sixth sound group is abandoned, while in the case of a sector at an odd-numbered address, the data of the first sound group is abandoned. More specifically, the system controller 18 executes control so that the data corresponding to the sound group SG5 of the digital data output from the encoder/ decoder 13 are not transferred to the memory 12.

Although it was arranged such that the signal of the sound group SG5 is not used at all times in the high-speed reproducing operation in the embodiment shown in FIG. 16, it is possible to use the same according to the need. In this case, the reading processing of four sectors in step S2 of FIG. 9 is executed for example according to the flowchart shown in FIG. 17.

First, in step S31, the first sector is read. In step S32, it is determined whether or not the read sector is usable for reproducing a signal. Since the header address is recorded in each sector as described above, for example the sector whose header address could not be read is judged to be unusable. As another way, the number of errors occurring at the time of processing for error detection and correction is counted and if there is present a sector having pieces of uncorrectable data of a number exceeding a predetermined number, it may be judged unusable.

When the read sector is judged to be usable in step S32, the flow advances to step S33, in which it is determined whether or not the pair to the first sector is unusable. When the pair to the first sector is also judged usable, the flow advances to step S34, in which it is determined whether or not the first sector is a sector at an odd-numbered address according to the header address.

When the first sector is judged to be a sector not at an odd-numbered address, for example to be a sector as shown in FIG. 14, digital data readout from the sector is stored into the memory 12. Then, the flow advances from step S34 to step S36, in which it is determined whether or not the reading of four sectors has been finished according to for example the header addresses or the like of the sectors. When four sectors have not yet been read, the flow advances to step S43, in which the sector to be read is changed. Then, the flow returns to step S31, in which reading of the following sector is performed.

Operations for reading and reproducing four sectors whose first sector at the position reached after the access is not at an odd-numbered address, i.e., four sectors starting with a sector at an even-numbered address, are performed through the steps of S31, S32, S33, S34, S36, and S43 as described above.

On the other hand, when the first sector of four sectors starting at the position reached after the access is a sector at an odd-numbered address, for example as shown in FIG. 15, if the sector is judged to be that at an odd-numbered address according to the header address of the sector in step S34, the flow advances from step S34 to step S35, in which use of the sound group SG5 at the head of the first sector is inhibited. Although the data read from this sector is stored in the memory 12, it is not read from the memory 12. When the data is transferred from the memory 12 to the compressor/ expander 10, setting of the start address and end address is adjusted by the memory controller 11 so that the number of bytes is reduced from that in the normal transfer, i.e., so that the portion of the sound group SG5 is omitted. The subsequent data processing is performed using the sound groups SG6 to SGA.

Then the flow advances from step S35 to step S36 and to step S43 and the second sector, i.e., the sector at an even-numbered address, is read. Reading of the second sector and the following third sector is executed through the steps of S31, S32, S33, S34, S36, and S43 the same as described above.

In the case of reading of the fourth sector, i.e., a sector at an even-numbered address, the flow advances to step S36 through steps S31 to S34, and advances from step S36 to step S37. In step S37, if it is determined that the sector is the last sector at an even-numbered address, the flow advances to step S38, in which use of the sound group SG5 is inhibited.

When it is determined that the read sector is not usable in step S32, the flow advances to step S39, in which it is determined whether or not the sector pairing with this sector is already read according to the header address of the sector or the like. When the sector pairing with this is already read, the flow advances to step S40, in which use of the sound group SG5 of the sector already read is inhibited because the sector which had just been read was judged to be unusable.

When use of the sound group SG of the sector already read has been inhibited in step S40, or when it has been determined that the sector pairing with this sector is not yet read, the flow advances to step S41, in which a counter UUS indicative of the number of unusable sectors is incremented by 1. Then in step S42, it is determined whether or not the number of the counts in USS is equal to or greater than 4. When it is below 4, the flow advances to step S43 and step S31 and reading of the following sector is performed. For example when the sector δ in FIG. 14 is judged to be unusable, reading of the sector subsequent to the sector δ is performed.

When it is determined that the number of sectors which could not be read has become four or above, the processing is stopped. More specifically, the flow returns to step S3 of FIG. 9, in which a 10-track jump is performed and the flow proceeds to read the following four sectors.

When, in the reading of a sector at an odd-numbered address, the sector is judged to be usable, if the sector pairing with this sector is judged unusable in step S33, the flow advances from step S33 to step S35. In step S35, the sound group SG5 of the sector at the odd-numbered address is inhibited.

In the reading of four sectors in the above example, when a read sector is judged to be unusable, it has been arranged such that the following sector is read. However, it may also be arranged such that four sectors, including an unusable sector, are read, data of usable sectors out of them are reproduced and output, and then an accessing operation is immediately started. It has also been arranged in the above such that the sector is judged to be unusable when its header address cannot be read. However, there is a case where the header address of a sector can be read and the sector is judged usable but then the sector is judged unusable because of errors present in the data of the sector. In such case, the data of the sector, if containing errors, may be reproduced as it is and output. The reproduced analog signal does not produce right reproduced sound, but there arises substantially no problem because it is produced during the course of high-speed reproduction.

In the high-speed reproduction, it was arranged in the above such that, when there is an unusable sector, use of the sound group SG5 of the sector pairing with the unusable sector is inhibited, even if it is of a usable sector. The same practice may also be taken up in normal reproducing operation.

Figure 18:
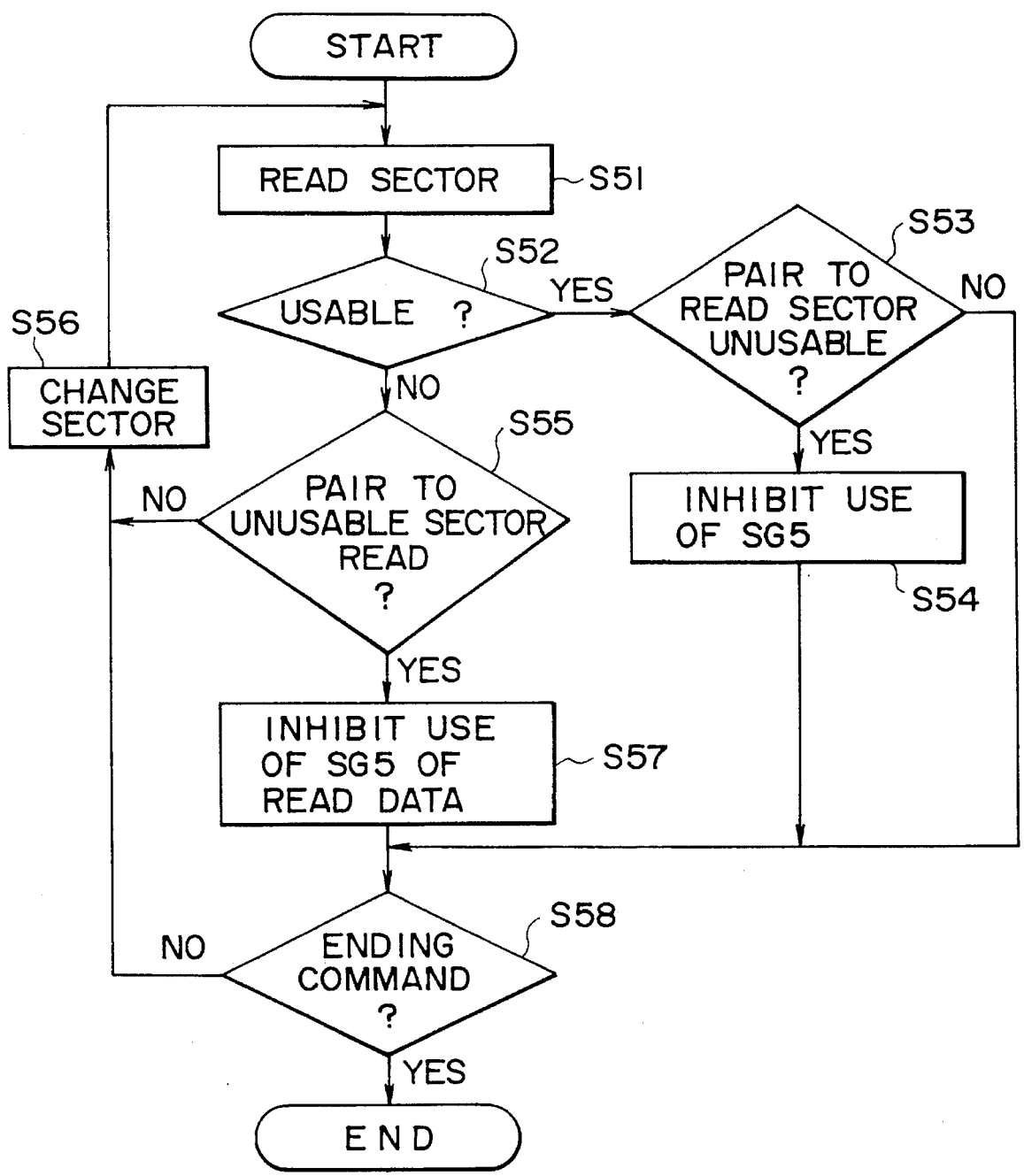
FIG. 18 is a flowchart explanatory of reproducing operations performed in a disc recording and reproducing apparatus of the present invention.

FIG. 18 shows processing in normal reproduction. First, in step S51, a sector is read, and in step S52, it is judged whether or not the sector is usable according to whether or not its header address is reproducible. When the sector is judged usable, the flow advances to step S53, in which it is determined whether or not the sector pairing with the sector just read was judged unusable.

If it is determined in step S53 that sector pairing with the sector was not judged unusable, the flow advances to step S58. If there is no command to end the reproduction in step S58, the flow moves to step S56. In step S56, the reproduced sector is changed to a following sector, and the flow returns to step S51 and therein reading of the sector is performed. Thus, unless sectors are not judged unusable, processing is repeatedly performed through the steps of S51, S52, S53, S58, and S56.

When the sector is judged unusable in step S52, the flow advances to step S55, in which it is determined whether or not the sector pairing with the sector just judged unusable has already been read. When that sector pairing with the sector has not been read, the flow advances to step S56, in which a subsequent sector is set as the object of reproduction.

When, in step S55, it is determined that the sector pairing with the sector judged unusable has already been read, the flow advances to step S57, in which use of the sound group SG5 of the sector already read is inhibited. In step S58, if there is no command to end reproduction input from the input unit 19 or issued from the system controller 18, the flow returns through step S56 to step S51, from which reading of a subsequent sector is started.

When the read sector is judged usable in step S52 and the sector pairing with this sector is judged unusable in step S53, the flow advances to step S54, in which use of the sound group SG5 of the sector just read is inhibited, and only the data of the sector judged usable is reproduced and output.

By practicing as described above, even in the normal playback, a noise is suppressed from being produced from the signal of the sound group SG5 connecting two sectors when one of the sectors is judged unusable.

What is claimed is:

1. A reproducing apparatus of a recording medium which has address data recorded thereon, a set of data discretely recorded in a plurality of small recording areas thereon, and information indicative of connective relationships between the small recording areas recorded thereon, said reproducing apparatus comprising:

read means for reading data recorded on said recording medium;

a memory for storing the information indicative of connective relationships between the small recording areas read by said read means; and a controller for executing control in high-speed reproduction so that said read means repeatedly accesses preceding small recording areas in accordance with the information stored in said memory and reads the data stored in the preceding small recording areas in units of a predetermined data amount and for further executing control so that, when said read means has moved to a position outside a preceding small recording area, said read means accesses a position in a subsequent small recording area in a connective relationship with the preceding small recording area, and, when the position in said subsequent small recording area is off a start address of said subsequent small recording area and within a predetermined range of the start address of said subsequent small recording area, said read means reads data from the recording medium starting at said position, wherein said controller includes judgement means for judging whether the data length of a subsequent small recording area is smaller than a predetermined data length, and, when the length is judged to be smaller than the predetermined length, said read means is caused to access a next-subsequent small recording area in accordance with the information stored in said memory.

2. A reproducing apparatus for a recording medium according to claim 1, wherein said controller includes judgement means for judging whether or not the data read by said read means is reproducible in units of a sector constituting the data.

3. A method of reproducing a recording medium, which has address data recorded thereon, a set of data discretely recorded in a plurality of small recording areas thereon, and information indicative of connective relationships between the small recording areas recorded thereon, said reproducing method comprising the step of:

storing the information indicative of connective relationships between the small recording areas read by a read means into a memory;

executing control in high-speed reproduction by means of a controller so that said read means repeatedly accesses in accordance with the information stored in said memory and reads the data stored in the small recording areas in units of a predetermined data amount;

executing further control so that, when said read means has moved to a position outside a preceding small recording area after an access, said read means accesses a position in a subsequent small recording area in a connective relationship with the preceding small recording area, and, when the position in said subsequent small recording area reached after the access is within a predetermined range of the start address of said subsequent small recording area, said read means reads data starting at said position;

judging whether the data length of a subsequent small recording area reached after an access is smaller than a predetermined data length; and causing, when the length is judged to be smaller than the predetermined length, said read means to access a next-subsequent small recording area in accordance with the information stored in said memory.

4. A reproducing method according to claim 3, said reproducing method further comprising the steps of judging whether or not the data read by said means is reproducible for each of sectors constituting the data and reproducing only the sectors judged to be reproducible.

5. A method of reproducing a recording medium, which has address data recording thereon, data discretely recorded in a plurality of small recording areas of a data-recording area thereof, and information indicative of connective relationships between the small recording areas, with said data of the small recording areas being constituted of a plurality of sectors, each sector being formed of a plurality of segments, and one data unit thereof being formed of a pair of sectors, said reproducing method comprising the steps of:

storing the information indicative of connective relationships between the small recording areas read by a read means into a memory;

executing control in high-speed reproduction by means of a controller so that said read means repeatedly accesses in accordance with the information stored in said memory and reads the data stored in the small recording areas in units of a predetermined data amount, and executing further control so that, when said read means has moved to a position outside a preceding small recording area after an access, said read means accesses a subsequent small recording area in a connective relationship with the preceding small recording area, and, when the position in said subsequent small recording area reached after the access is within a predetermined distance from a start address of said subsequent small recording area, said read means reads data starting at said position; and executing further control so that when said position in said subsequent small recording area is greater than a predetermined distance from the start address of said subsequent small recording area, said read means successively accesses at least one of a plurality of new positions on the recording medium and, when one of the plurality of new positions comes within said predetermined distance from a start address of said subsequent small recording area, said read means reads data recorded in said subsequent small recording area starting at said new position.

6. A reproducing method according to claim 5, further comprising the step of stopping reproduction of a data unit when either one of said sectors in a pair is judged to be unreproducible.

7. A reproducing method according to claim 6, further comprising the step of reading data, when a small recording area reached after the access is a sector starting with a segment connecting both of said sectors in pair, starting with the segment which follows the segment located in said connecting portion.

8. A reproducing method according to claim 5, further comprising the step reproducing data using segments other than a segment connecting both of said sectors in pair.

9. A reproducing method of a recording medium, which has address data recorded thereon, data discretely recorded in a plurality of small recording areas of a data-recording area thereof, and information indicative of connective relationships between the small recording areas recorded thereon, said data of the small recording areas being constituted of a plurality of sectors, each sector being formed of a plurality of segments, and one data unit thereof being formed of a pair of sectors, said reproducing method comprising the steps of:

storing the information indicative of connective relationships between the small recording areas read by a read means into a memory;

executing control in high-speed reproduction by means of a controller so that said read means repeatedly accesses in accordance with the information stored in said memory and reads the data stored in the small recording areas in units of a predetermined data amount, and executing further control so that, when said read means has moved to a position outside a preceding small recording area after an access, said read means accesses a subsequent small recording area in a connective relationship with the preceding small recording area, and, when said position in said subsequent small recording area is at an address within a predetermined range of the start address of said subsequent small recording area, said read means reads data starting at said position;

causing, in the high-speed reproduction, said read means to again access when the number of errors in the data read by said read means is over a predetermined number, and to reproduce data using segments other than a segment connecting both of said sectors in a pair.

10. A reproducing method of a recording medium, which has address data recorded thereon, data discretely recorded in a plurality of small recording areas of a data-recording area thereof, and information indicative of connective relationships between the small recording areas, said data of the small recording areas being constituted of a plurality of sectors, each sector being formed of a plurality of segments, and one data unit thereof being formed of a pair of sectors, said reproducing method comprising the steps of:

judging, by means of judgment means, whether or not data read by a read means is reproducible for each sector; and reproducing and outputting only the sectors judged to be reproducible by said judgment means.

11. A reproducing method according to claim 10, wherein said judgment means is adapted to judge whether or not read data is reproducible based on a determination made in accordance with address data recorded in the recording medium as to whether or not the segment of data read by said read means is a segment connecting both of said sectors in a pair.

12. A reproducing method according to claim 10, wherein said judgement means is applied to judge whether or not read data is reproducible according to number of errors in read data by said road means.

13. A reproducing method according to claim 10, further comprising the step of reproducing data using segments other than the segment connecting both of said sectors in a pair.

14. A reproducing method of a recording medium, which has address data recorded thereon, data discretely recorded in a plurality of small recording areas of a data-recording area thereof, and information indicative of connective relationships between the small recording areas, said data being constituted of a plurality of sectors, each sector being formed of a plurality of segments, and one data unit thereof being formed of a pair of sectors, said reproducing method comprising the steps of:

storing the information indicative of connective relationships between the small recording areas read by read means into a memory;

executing control in high-speed reproduction by means of a controller so that said read means repeatedly accesses in accordance with the information stored in said memory and reads the data stored in the small recording areas in units of a predetermined data amount; and judging, by means of said controller, whether or not the data read by said read means is reproducible for each sector, and reproducing and outputting only the sectors judged to be reproducible.

15. A reproducing method according to claim 14, wherein said controller is adapted to judge whether or not read data is reproducible based on a determination made in accordance with the address data recorded in the recording medium as to whether or not the segment of data read by said read means is a segment connecting both said sectors in a pair.

16. A reproducing method according to claim 14, wherein said controller is adapted to judge whether or not read data is reproducible according to number of errors in read data by said read means.

17. A reproducing method according to claim 14, further comprising the step of reproducing data using segments other than the segment connecting both of said sectors in a pair.

18. A reproducing apparatus according to claim 1, wherein the predetermined data length read means repeatedly accesses during high-speed reproduction.

19. A reproducing method according to claim 3, wherein the predetermined data length is the length between addresses accesses when the read means repeatedly accesses accessed when the read reproduction.

20. A reproducing method according to claim 9, further comprising the steps of judging whether or not the data length of the subsequent small recording area is smaller than a predetermined data length, and causing the read means to access a second subsequent small recording area which is in a connective relationship with the subsequent small recording area in accordance with the information stored in the memory when the length of the subsequent small recording area is judged to be smaller than the predetermined length, wherein the predetermined data length is the length between addresses accessed when the read means repeatedly accesses during high-speed reproduction.

21. A reproducing apparatus for a recording medium which has address data recorded thereon, a set of data discretely recorded in a plurality of small recording area thereon, and information indicative of connective relationships between the small recording areas recorded thereon, the reproducing apparatus comprising:

read means for reading data recorded on the recording medium;

a memory for storing the information indicative of connective relationships between the small recording areas read by the read means; and a controller for executing control in high-speed reproduction so that the read means repeatedly accesses a first small recording area in accordance with the information stored in the memory and reads the data stored in the first small recording area in units of a predetermined data amount and for further executing control so that, when the read means has moved to a position outside the first small recording area, the read means access a position in a second small recording area in a connective relationship with the first small recording area, and, when the position accessed in the second small recording area is off a start address of the second small recording area and within a predetermined range of the start address of the second small recording area, the read means repeatedly accesses the second small recording area and reads data in units of a predetermined amount starting at the position.

* * * * *